(12) United States Patent
Park et al.

(10) Patent No.: US 10,701,469 B2
(45) Date of Patent: Jun. 30, 2020

(54) ELECTRONIC DEVICE

(71) Applicant: Samsung Electronics Co., Ltd., Gyeonggi-do (KR)

(72) Inventors: Young-Bae Park, Seoul (KR); Byoung-Hee Lee, Seoul (KR); Jae-Hee You, Gyeonggi-do (KR); Tae-Eon Kim, Seoul (KR); Han-Bom Park, Gyeonggi-do (KR); Sun-Young Lee, Gyeonggi-do (KR); Byoung-Uk Yoon, Gyeonggi-do (KR); Kyung-Hee Lee, Seoul (KR); Ho-Chul Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/348,281

(22) PCT Filed: Oct. 25, 2017

(86) PCT No.: PCT/KR2017/011861
§ 371 (c)(1),
(2) Date: May 8, 2019

(87) PCT Pub. No.: WO2018/088726
PCT Pub. Date: May 17, 2018

(65) Prior Publication Data
US 2019/0320253 A1 Oct. 17, 2019

(30) Foreign Application Priority Data

Nov. 9, 2016 (KR) .................. 10-2016-0148987

(51) Int. Cl.
*H04R 1/02* (2006.01)
*H04M 1/03* (2006.01)
(Continued)

(52) U.S. Cl.
CPC ............ *H04R 1/028* (2013.01); *H04M 1/035* (2013.01); *H04N 5/2253* (2013.01); *H04R 1/345* (2013.01);
(Continued)

(58) Field of Classification Search
CPC ........ H04R 2499/11; H04R 1/02; H04R 5/02; H04R 1/28
(Continued)

(56) References Cited

U.S. PATENT DOCUMENTS

2007/0049359 A1   3/2007  Sung
2007/0291961 A1  12/2007  Shin
(Continued)

FOREIGN PATENT DOCUMENTS

KR    10-2007-0119448 A    12/2007
KR    10-2013-0040600 A     4/2013
(Continued)

*Primary Examiner* — Alexander Krzystan
(74) *Attorney, Agent, or Firm* — Cha & Reiter, LLC.

(57) ABSTRACT

An electronic device according to various embodiments of the present invention may comprise: a housing comprising a first surface facing in a first direction and a second surface facing in a second direction that is opposite to the first direction, the first surface comprising an at least partially transparent part and at least one opening formed adjacent to the at least partially transparent part; a camera positioned inside the housing, the camera comprising an image sensor facing in the first direction through the at least partially transparent part of the housing; and an acoustic component arranged between the first surface and the second surface, the acoustic component comprising a vibration plate configured to generate a sound such that the same moves in at least one direction selected from the first and second directions, a first passage formed in a third direction that is substantially perpendicular to the first direction such that the generated sound passes through the same, and a second (Continued)

passage formed along a fourth direction that is different from the third direction so as to connect the first passage and the at least one opening; a wireless communication circuit positioned inside the housing and electrically connected to the acoustic component so as to provide the acoustic component with a signal regarding the sound; a display exposed through the first surface and positioned adjacent to the camera; and a processor positioned inside the housing and electrically connected to the camera, the acoustic component, the wireless communication circuit, and the display. Various other embodiments are also possible.

15 Claims, 22 Drawing Sheets

(51) Int. Cl.
    *H04N 5/225*     (2006.01)
    *H04R 1/34*     (2006.01)
    *H04R 3/00*     (2006.01)
    *H04M 1/02*     (2006.01)

(52) U.S. Cl.
    CPC .............. *H04R 3/00* (2013.01); *H04M 1/0264* (2013.01); *H04M 1/0266* (2013.01); *H04R 2420/07* (2013.01); *H04R 2499/11* (2013.01); *H04R 2499/15* (2013.01)

(58) Field of Classification Search
    USPC ....... 381/345, 336, 333, 160, 352, 373, 338, 381/339
    See application file for complete search history.

(56) References Cited

U.S. PATENT DOCUMENTS

| | | | |
|---|---|---|---|
| 2009/0303691 A1* | 12/2009 | Choi | H05K 1/147 361/768 |
| 2013/0094686 A1 | 4/2013 | Shin et al. | |
| 2013/0156233 A1 | 6/2013 | Joo | |
| 2014/0063821 A1* | 3/2014 | Hegde | H04M 1/0264 362/382 |
| 2014/0370937 A1* | 12/2014 | Park | G06F 1/1626 455/566 |
| 2017/0123575 A1* | 5/2017 | Evans | H04N 5/2254 |
| 2018/0035203 A1* | 2/2018 | Hirai | H04M 1/02 |
| 2018/0109871 A1* | 4/2018 | Huh | G06F 1/1652 |

FOREIGN PATENT DOCUMENTS

| | | |
|---|---|---|
| KR | 10-2013-0071173 A | 6/2013 |
| KR | 10-2013-0076450 A | 7/2013 |
| KR | 10-2014-0021928 A | 2/2014 |
| KR | 10-2015-0033976 A | 4/2015 |
| KR | 10-2016-0122388 A | 10/2016 |

* cited by examiner

ELECTRONIC DEVICE

CROSS-REFERENCE TO RELATED APPLICATION(S)

This application is a National Phase Entry of PCT international Application No. PCT/KR2017/011861, which was filed on Oct. 25, 2017, and claims priority to Korean Patent Application No. 10-2016-0148987, which was filed on Nov. 9, 2016, the contents of which are incorporated herein by reference.

BACKGROUND

1. Field

Various embodiments of the present disclosure relate to an electronic device, for example, an electronic device including an acoustic component.

2. Description of the Related Art

An electronic device refers to a device that executes a specific function according to a loaded program, such as a home appliance, an electronic notebook, a portable multimedia player (PDP), a mobile communication terminal, a tablet personal computer (PC), a video/audio player, a desktop/laptop computer, an in-vehicle navigator, and so on. For example, these electronic devices may output stored information visually or audibly. Along with an increase in the integration level of electronic devices and the increasing popularity of ultra-high speed, large-capacity wireless communication, a single mobile communication terminal has recently been equipped with various functions. For example, functions such as a communication function, an entertainment function such as gaming, a multimedia function such as music/video play, a communication and security function for mobile banking or the like, scheduling, and an electronic wallet are integrated in one electronic device.

SUMMARY

A mobile communication terminal, which is a kind of electronic device, may be provided with a camera disposed at the center of its front surface, a display that displays a screen, an acoustics part that outputs sound, and openings that radiate the sound output from the acoustic component to the outside.

When the camera is disposed at the center of the front surface of the mobile communication terminal, the openings may not be disposed at the center. Therefore, the volume of sound reaching a user may be decreased.

Moreover, with the camera disposed at the center of the front surface of the mobile communication terminal, if the acoustic component is disposed eccentric from the center, sound generated from the acoustic component does not radiate actively from the center of the front surface of the mobile communication terminal, thereby decreasing the sound volume.

In addition, as the display size of the mobile communication terminal increases, speaker openings may be formed closer to the top edge of the mobile communication terminal. If the openings are formed close to the top edge of the mobile communication terminal, and thus the acoustic component is disposed eccentric from the center of the mobile communication terminal, it may be difficult to arrange the openings through which sound from the acoustic component is radiated at the center of the mobile communication terminal. If the openings that radiate sound are not arranged at the center of the mobile communication terminal, the sound volume may be decreased, thus degrading sound quality.

According to various embodiments of the present disclosure, an electronic device which actively radiates sound at the center in spite of eccentric arrangement of an acoustic component, and a method therefor are provided.

According to various embodiments of the present disclosure, an electronic device which secures the volume of sound in spite of arrangement of an acoustic component apart from openings without overlap, and a method therefor are provided.

According to various embodiments of the present disclosure, an electronic device may include a housing comprising a first surface facing in a first direction, and a second surface facing in a second direction opposite to the first direction, the first surface comprising an at least partially transparent part, and at least one opening formed adjacent to the at least partially transparent part, a camera positioned inside the housing, and comprising an image sensor facing in the first direction through the at least partially transparent part of the housing, an acoustic component disposed between the first surface and the second surface, and comprising a diaphragm configured to generate sound and move the sound in at least one of the first direction or the second direction, a first passage formed along a third direction substantially perpendicular to the first direction, to allow the sound to pass therethrough, and a second passage formed along a fourth direction different from the third direction, while connecting between the first passage and the at least one opening, a wireless communication circuit disposed inside the housing, and electrically connected to the acoustic component to provide a signal for sound to the acoustic component, a display exposed through the first surface, and disposed adjacent to the camera, and a processor disposed inside the housing, and electrically connected to the camera, the acoustic component, the wireless communication circuit, and the display.

According to various embodiments of the present disclosure, an electronic device may include a housing comprising a first surface facing in a first direction, and a second surface facing in a second direction opposite to the first direction, the first surface comprising an at least partially transparent part, at least one opening formed adjacent to the at least partially transparent part, a first peripheral portion, and a second peripheral portion longer than the first peripheral portion, a camera positioned inside the housing, adjacent to the peripheral portion, and comprising an image sensor facing in the first direction through the at least partially transparent part of the housing, a display exposed through the first surface, and comprising an edge extending in substantially parallel to the first peripheral portion and apart from an edge of the first peripheral portion by a distance of 0.5 mm to 6 mm, an acoustic component disposed between the first surface and the second surface, fluidly connected to the opening, and comprising a diaphragm located within a range of 0.2 mm to 6 mm from the camera, when seen from above the first surface, a wireless communication circuit disposed inside the housing, and electrically connected to the acoustic component to provide a signal for sound to the acoustic component, and a processor disposed inside the housing, and electrically connected to the camera, the acoustic component, the wireless communication circuit, and the display.

According to various embodiments of the present disclosure, an electronic device may include a housing comprising a first surface facing in a first direction, and a second surface facing in a second direction opposite to the first direction, the first surface comprising an at least partially transparent part, at least one opening formed adjacent to the at least partially transparent part, a first peripheral portion, and a second peripheral portion longer than the first peripheral portion, a camera positioned inside the housing, adjacent to the first peripheral portion, and comprising an image sensor facing in the first direction through the at least partially transparent part of the housing, a display exposed through the first surface, and extending in substantially parallel to the first peripheral portion, an acoustic component disposed between the first surface and the second surface, connected to the at least one opening, and comprising a diaphragm located to overlap at least partially with the display, when seen from above the first surface, a wireless communication circuit disposed inside the housing, and electrically connected to the acoustic component to provide a signal for sound to the acoustic component, and a processor disposed inside the housing, and electrically connected to the camera, the acoustic component, the wireless communication circuit, and the display.

According to various embodiments of the present disclosure, an electronic device may include a housing comprising a plurality of openings, and an acoustic component comprising a diaphragm accommodated in the housing, disposed apart from the plurality of openings, and generating sound in a first direction, and a passage formed between the plurality of openings and the diaphragm, and allowing the sound generated from the diaphragm to pass therethrough.

According to various embodiments of the present disclosure, a method of operating an electronic device may include generating sound in a first direction from a diaphragm of an acoustic component, moving the sound in a third direction along a first passage of the acoustic component, moving the sound in a fourth direction a long a second passage of the acoustic component, and outputting the sound to an outside through a plurality of openings.

An electronic device according to various embodiments of the present disclosure is provided with an acoustic component that connects a diaphragm to a plurality of openings. Therefore, even though the diaphragm is disposed apart from the plurality of openings, the quality of sound radiated through the plurality of openings may be secured stably.

The electronic device according to various embodiments of the present disclosure may actively radiate sound at the center even though the acoustic component is disposed eccentric.

In the electronic device according to various embodiments of the present disclosure, since the plurality of openings are arranged adjacent to an edge of a first peripheral portion, an edge of a display is positioned adjacent to the edge of the first peripheral portion, thereby increasing the proportion of the display on a first surface of a housing. In the electronic device according to various embodiments of the present disclosure, even though the acoustic component is disposed eccentric, sound from the acoustic component is transferred to the openings through first and second passages. Accordingly, it is possible to design the openings to be arranged at the center of the terminal, thereby improving the volume and quality of sound radiated from the openings.

Figure 1:
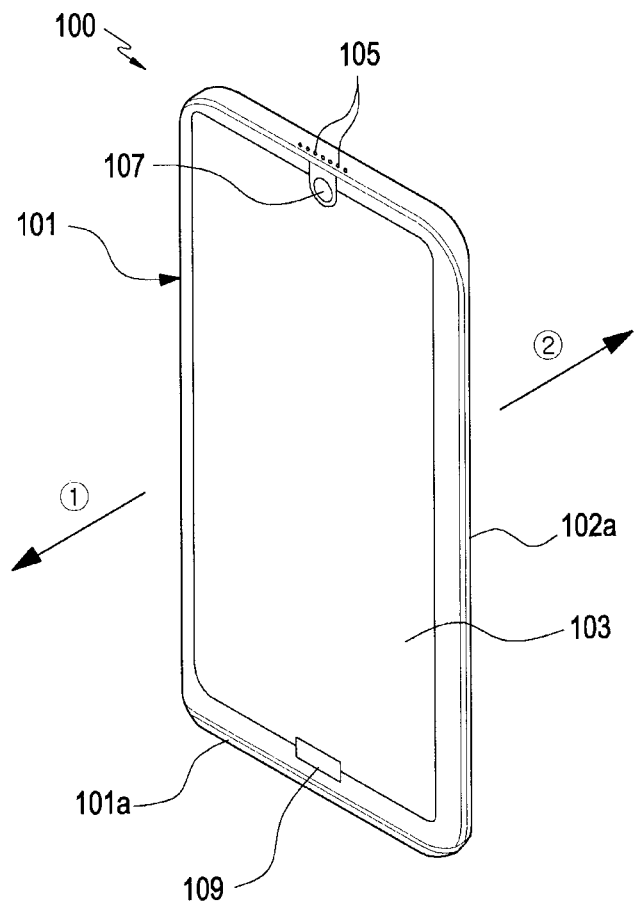
FIG. 1 is a front perspective view illustrating an electronic device according to one of various embodiments of the present disclosure.

| | |
|---|---|
| 100: electronic device | 101: housing |
| 103: transparent part | 105: openings |
| 107: camera | 108: acoustic component |

DETAILED DESCRIPTION

Various embodiments of the present disclosure are described with reference to the accompanying drawings. However, the scope of the present disclosure is not intended to be limited to the particular embodiments, and it is to be understood that the present disclosure covers various modifications, equivalents, and/or alternatives falling within the scope and spirit of the present disclosure. With regard to the description of the drawings, similar reference numerals may be used to refer to similar elements.

In various embodiments of the present disclosure, the term "have", "may have", "include" or "may include" signifies the presence of a feature (e.g., number, function, operation, or component like a part), not excluding the presence of one or more other features.

As used herein, each of such phrases as "A or B", "at least one of A and/or B", or "one or more of A and/or B" may include all possible combinations of the items enumerated together in a corresponding one of the phrases. For example, "A or B", "at least one of A and B", or "at least one of A or B" may represent all of the cases of (1) inclusion of at least one A, (2) inclusion of at least one B, and (3) inclusion of at least one A and at least one B.

The term as used in the present disclosure, "$1^{st}$", "$2^{nd}$", "first" or "second" may be used for the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the disclosure.

When it is said that a component (e.g., a first component) is "operatively or communicatively coupled with/to" or "connected to" another component (e.g., a second component), it should be understood that the one component is connected to the other component directly or through any other component (e.g., a third component). On the other hand, when it is said that a component (e.g., a first component) is "directly connected to" or "directly coupled to" another component (e.g., a second component), it may be understood that there is no other component (e.g., a third component) between the components.

The terms as used in the present disclosure are provided to describe merely specific embodiments, not intended to limit the scope of other embodiments. It is to be understood that singular forms include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

FIG. 1 is a front perspective view illustrating an electronic device according to one of various embodiments of the present disclosure.

An electronic device 100 according to one of various embodiments of the present disclosure may be one of various types of electronic devices such as a mobile communication terminal, a tablet personal computer (PC), or a wearable device. The electronic device 100 according to one of various embodiments of the present disclosure will be described in the context of a mobile communication terminal, by way of example.

Referring to FIG. 1, the electronic device 100 according to one of various embodiments of the present disclosure may include a housing 101, a transparent part 103, a camera 107, and a plurality of openings 105.

The housing 101 may include a first surface 101a facing in a first direction ① and a second surface 102a facing in a second direction ② opposite to the first direction ①.

The transparent part 103 is positioned on the first surface 101a, and may implement a screen output from a later-described display. The transparent part 103 may be formed of glass or transparent reinforced plastic. For example, the transparent part 103 may be included in a front window. According to various embodiments of the present disclosure, the transparent part 103 may be formed of any of various transparent materials with rigidity, not limited to glass or transparent reinforced plastic.

The camera 107 may include an image sensor which is positioned inside the housing 101, and faces in the first direction through the at least partially transparent part 103 of the housing 101.

The plurality of openings 105 may be formed in an upper part of the first surface 101a. The plurality of openings 105 may be formed adjacent to the transparent part 103 on which the camera 107 is disposed. The plurality of openings 105 may radiate sound generated from a later-described acoustic component to the outside of the housing 101. According to various embodiments of the present disclosure, the openings 105 may be used as various sensor holes, not limited to the function of sound emission.

A main home key 109 may be disposed in a lower part of the first surface 101a. A part of the main home key 109 may be surrounded by the transparent part 103.

Figure 2:
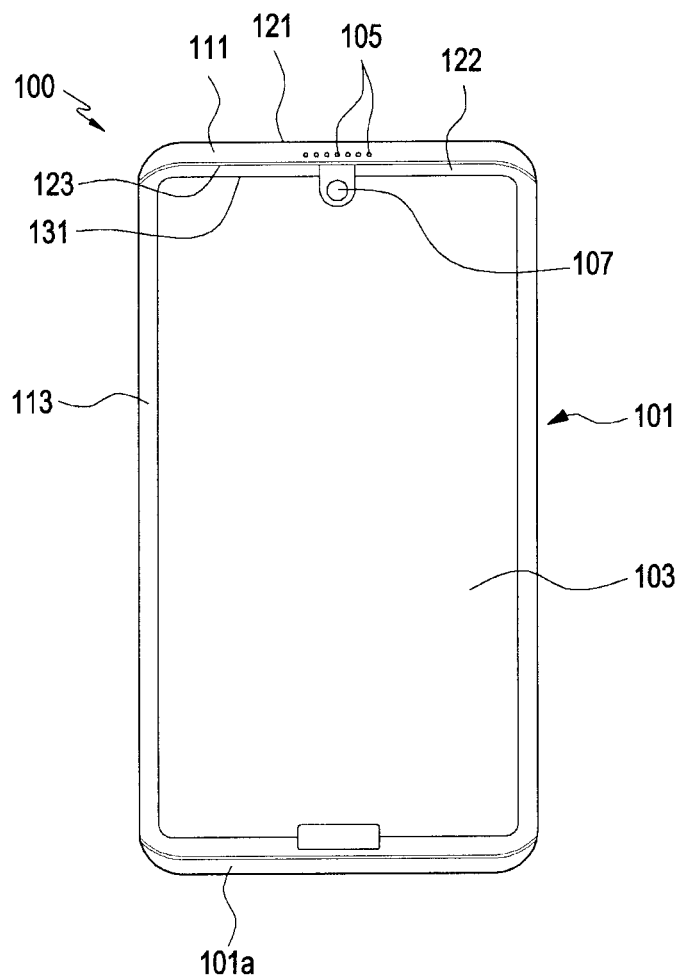
FIG. 2 is a front view illustrating an electronic device according to one of various embodiments of the present disclosure.

FIG. 2 is a front view illustrating an electronic device according to one of various embodiments of the present disclosure.

Referring to FIG. 2, the housing 101 of the electronic device 100 according to one of various embodiments of the present disclosure may include the first surface 101a with a first peripheral portion 111, and a second peripheral portion 113 longer than the first peripheral portion 111.

The plurality of openings 105 may be arranged on the first peripheral portion 111. According to various embodiments of the present disclosure, the front window may include the transparent part 103, and an outer area 122 of the window, surrounding the transparent part 103. The plurality of openings 105 may be arranged between a first edge 121 of the first peripheral portion 111 and an edge 123 of the outer area 122 of the window. According to various embodiments, the plurality of openings 105 may be arranged in various areas other than the transparent part 103, such as the window outer area 122, not limited to the first peripheral portion 111.

According to various embodiments, the display may be exposed through the first surface 101a, and include an edge 131 extending substantially in parallel to the first peripheral portion 111. The distance between the first peripheral portion 111 and the edge 131 of the display may be 0.5 mm to 6 mm.

Figure 3:
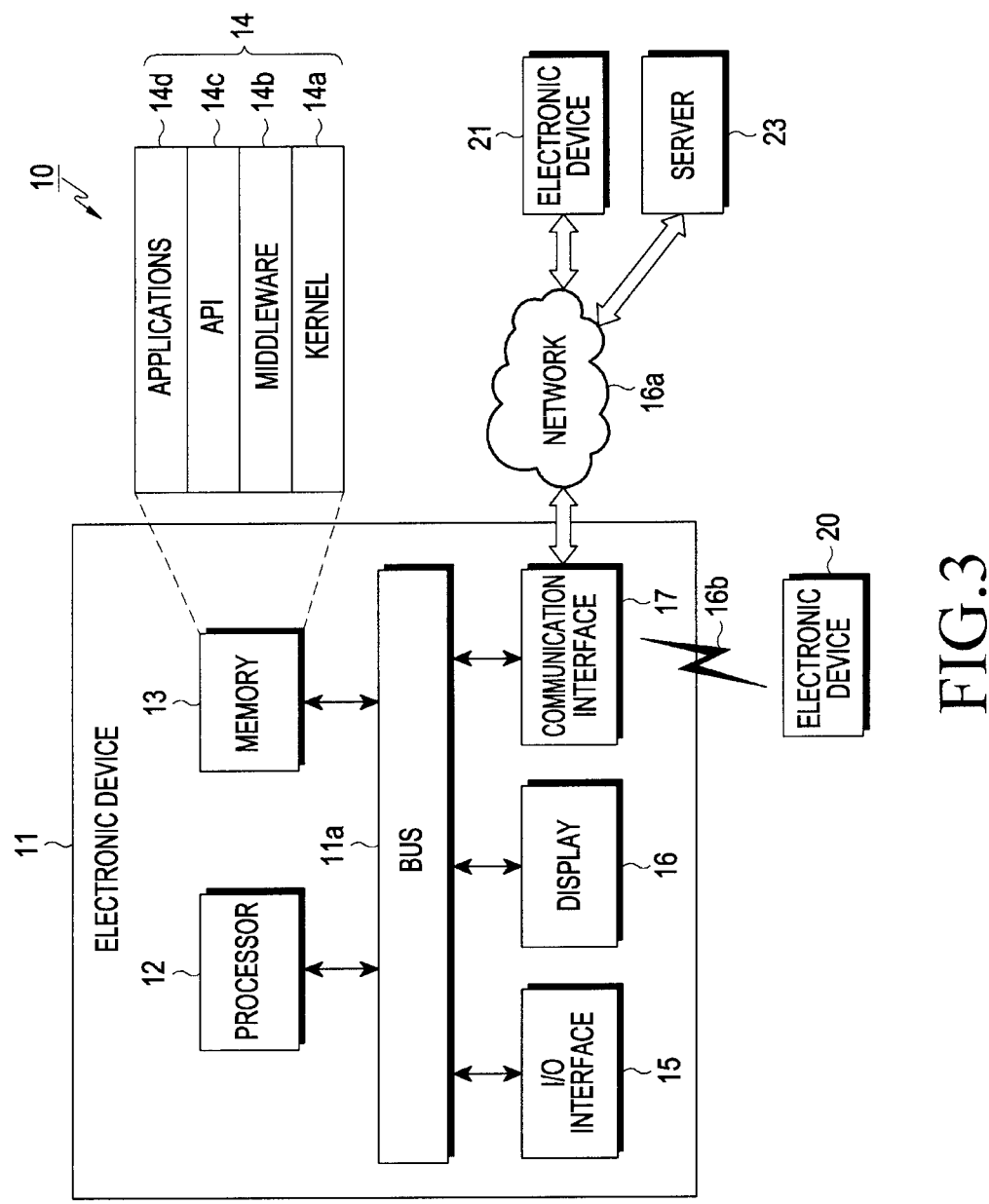
FIG. 3 is a view illustrating a network environment including an electronic device according to one of various embodiments of the present disclosure.

FIG. 3 is a view illustrating a network environment including an electronic device according to one of various embodiments of the present disclosure.

Referring to FIG. 3, an electronic device 11 in a network environment 10 according to various embodiments is described. The electronic device 11 may include a bus 11a, a processor 12, a memory 13, an input/output (I/O) interface 15, a display 16, and a communication interface 17. In some embodiments, at least one of the components may be omitted in the electronic device 11 or a component may be added to the electronic device 11. The bus 11a may interconnect the foregoing components 11 to 17, and include a circuit which allows communication (e.g., transmission of control messages or data) between the foregoing components. The processor 12 may include one or more of a central processing unit (CPU), an application processor (AP), or a communication processor (CP). The processor 12 may, for example, execute computation or data processing related to control and/or communication of at least one other component of the electronic device 11.

The memory 13 may include a volatile memory and/or a non-volatile memory. The memory 13 may, for example, store instructions or data related to at least one other component of the electronic device 11. According to an embodiment, the memory 13 may store software and/or a program 14. The program 14 may include, for example, a kernel 14a, middleware 14b, an application programming interface (API) 14c, and/or an application program (or "application") 14d. At least a part of the kernel 14a, the middleware 14b, or the API 14c may be called an operating system (OS). The kernel 14a may, for example, control or manage system resources (e.g., the bus 11a, the processor 12, or the memory 13) that are used in executing operations or functions implemented in other programs (e.g., the middleware 14b, the API 14c, or the application programs 14d). Also, the kernel 14a may provide an interface that allows the middleware 14b, the API 14c, or the application programs 14d to access individual components of the electronic device 11 and control or manage system resources.

The middleware 14b may serve as a medium through which the kernel 14a may communicate with, for example, the API 14c or the application programs 14d to transmit and receive data. Also, the middleware 14b may process one or more task requests received from the application programs 14d according to priority levels. For example, the middleware 14b may assign priority levels for using system resources (e.g., the bus 11a, the processor 12, or the memory 13) of the electronic device 11 to at least one of the application programs 147. The API 14c is an interface through which the application programs 14d control functions provided by the kernel 14a or the middleware 14b. For example, the API 14c may include at least one interface or function (e.g., a command) for file control, window control, video processing, or text control. The I/O interface 15 may output a command or data received from the user or an external device to the other component(s) of the electronic device 11, or output a command or data received from the other component(s) of the electronic device 11 to the user or the external device.

The display 16 may include, for example, a liquid crystal display (LCD), a light emitting diode (LED) display, an organic LED (OLED) display, a microelectromechanical systems (MEMS) display, or an electronic paper display. The display 16 may display, for example, various types of content (e.g., text, an image, a video, an icon, and/or a symbol) to the user. The display 16 may include a display driver IC (DDI) that generates a signal to drive the display 16. According to various embodiments, the DDI may be electrically connected to the display 16.

The communication interface 17 may establish communication, for example, between the electronic device 11 and an external device (e.g., a first external electronic device 20, a second external electronic device 21, or a server 23). For example, the communication interface 17 may be connected to a network 16a by wireless communication or wired communication and communicate with the external device (e.g., the second external electronic device 21 or the server 23) over the network 16a.

The wireless communication may include cellular communication using, for example, at least one of long-term evolution (LTE), LTE-Advance (LTE-A), code division multiple access (CDMA), wideband CDMA (WCDMA), universal mobile telecommunication system (UMTS), Wireless Broadband (WiBro), or global system for mobile communications (GSM). According to an embodiment, the wireless communication may include, for example, at least one of wireless fidelity (WiFi), Bluetooth, Bluetooth low power (BLE), Zigbee, near field communication (NFC), magnetic secure transmission (MST), radio frequency (RF) communication, or body area network (BAN). According to an embodiment, the wireless communication may include global navigation satellite system (GNSS). GNSS may be, for example, global positioning system (GPS), global navigation satellite system (Glonass), Beidou navigation satellite system (hereinafter, referred to as "Beidou"), or Galileo, the European global satellite-based navigation system. In the disclosure, the terms "GPS" and "GNSS" are interchangeably used with each other. The wired communication may include, for example, at least one of universal serial bus (USB), high definition multimedia interface (HDMI), recommended standard 232 (RS-232), power line communication, or plain old telephone service (POTS). The network 16a may be a telecommunication network, for example, at least one of a computer network (e.g., LAN or WAN), the Internet, or a telephone network.

Each of the first and second external electronic devices 20 and 21 may be of the same type as or a different type from the electronic device 11. According to various embodiments, all or a part of operations performed in the electronic device 11 may be performed in one or more other electronic devices (e.g., the electronic devices 20 and 21) or the server 23. According to an embodiment, if the electronic device 11 is to perform a function or a service automatically or upon request, the electronic device 11 may request at least a part of functions related to the function or the service to another device (e.g., the electronic device 20 or 21 or the server 23), instead of performing the function or the service autonomously, or additionally. The other electronic device (e.g., the electronic device 20 or 21 or the server 23) may execute the requested function or an additional function, and provide a result of the function execution to the electronic device 11. The electronic device 11 may provide the requested function or service based on the received result or by additionally processing the received result. For this purpose, for example, cloud computing, distributed computing, or client-server computing may be used.

Figure 4:
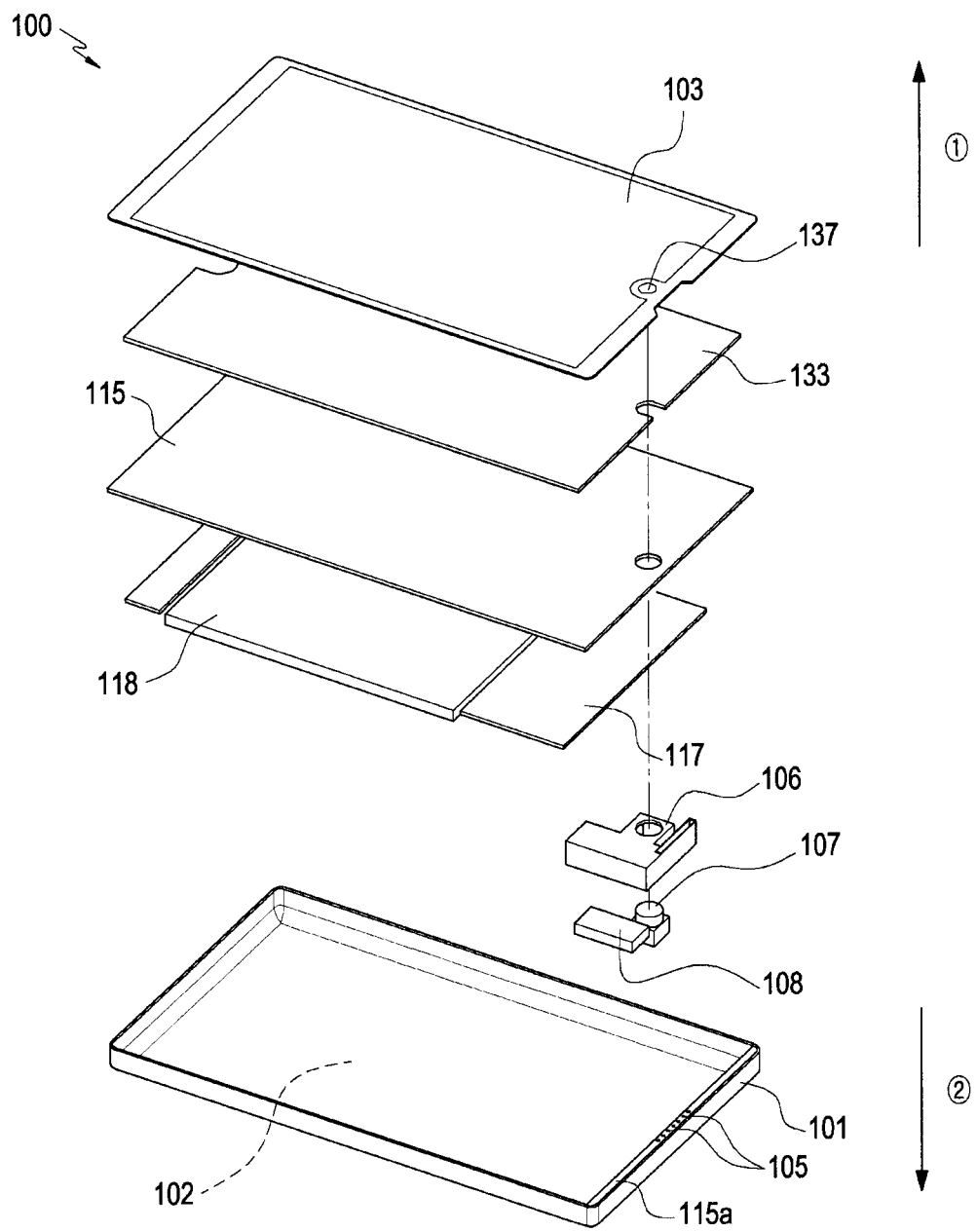
FIG. 4 is an exploded perspective view illustrating an electronic device according to one of various embodiments of the present disclosure.
Figure 5:
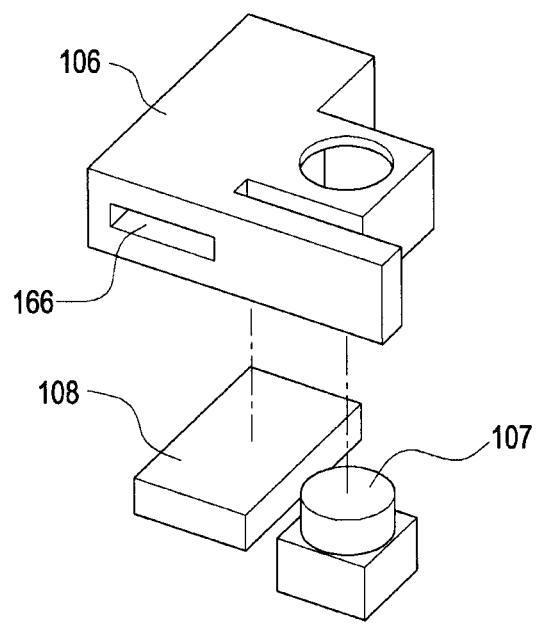
FIG. 5 is an exploded perspective view illustrating an acoustic component and a camera in an electronic device according to one of various embodiments of the present disclosure.
Figure 6:
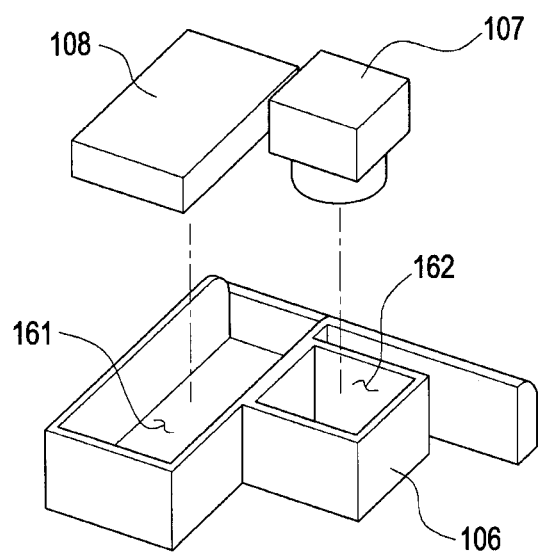
FIG. 6 is an exploded perspective view illustrating an acoustic component and a camera, seen from a different direction, in an electronic device according to one of various embodiments of the present disclosure.

FIG. 4 is an exploded perspective view illustrating an electronic device according to one of various embodiments of the present disclosure. FIG. 5 is an exploded perspective view illustrating an acoustic component and a camera in an electronic device according to one of various embodiments of the present disclosure. FIG. 6 is an exploded perspective view illustrating an acoustic component and a camera, seen from a different direction, in an electronic device according to one of various embodiments of the present disclosure.

Referring to FIGS. 4, 5 and 6, the electronic device 100 according to one of various embodiments of the present disclosure may include the housing 101, the transparent part 103, a display 133, a support member 115, the camera 107, a case 106, a circuit board 117, and a battery 118.

The housing 101 may include a second surface 102 facing in the second direction ②. The housing 101 may accommodate the components of the electronic device 100, that is, the display 133, the case 106, the camera 107, an acoustic component 108, the support member 115, the circuit board, or the battery 118. The plurality of openings 105 may be formed on an end 115a of the housing 101.

The transparent part 103 may include a camera hole 137. The image sensor of the camera 107 may face in the first direction ① through the camera hole 137. According to various embodiments of the present disclosure, the transparent part 103 may correspond to the first surface of the housing 101.

The display 133 may output a screen on the transparent part 103. The display 133 may be integrated with a touch panel to be used as an input device. For example, the touch panel may be loaded on the display 133 such that a virtual keypad is implemented on the display 133. The display 133 may have a size corresponding to the transparent part 103. An opening corresponding to the camera hole 137 may be formed on the display 133.

The support member 115 may be disposed between the first surface and the second surface 102a of the housing 101. The support member 115 may support the display 133. According to various embodiments, the support member 115 may be integrally formed with the housing 101.

The camera 107 may be disposed between the support member 115 and the second surface 102 of the housing 101.

The acoustic component 108 may be disposed between the support member 115 and the second surface 102 of the housing 101. The acoustic component 108 may include a diaphragm and magnets that vibrate the diaphragm.

The case 106 may accommodate the acoustic component 108 and the camera 107. The case 106 may provide a first accommodation space 161 that accommodates the acoustic component 108, and a second accommodation space 162 that accommodates the camera 107. The case 106 may be disposed between the support member 115 and the second surface 102 of the housing 101, and mounted to the support member 115. An opening 166 may be formed in the case 106. The opening 166 may connect the acoustic component 108 to the plurality of openings 105. The case 106 may include a passage (not shown) through which sound generated from the acoustic component 108 passes. The passage will be described later with reference to drawings. According to various embodiments of the present disclosure, the case 107 may accommodate various electronic parts such as a proximity sensor, including but not limited to the acoustic component 108 and the camera 107.

The circuit board 117 may be provided inside the housing 101. As a processor, a memory, or communication circuitry required to operate the electronic device 100 is mounted on the circuit board 117, the circuit board 117 may function as a main circuit board.

The battery 118 may be provided inside the housing 101. The battery 118 may be electrically connected to the circuit board 117.

Figure 7:
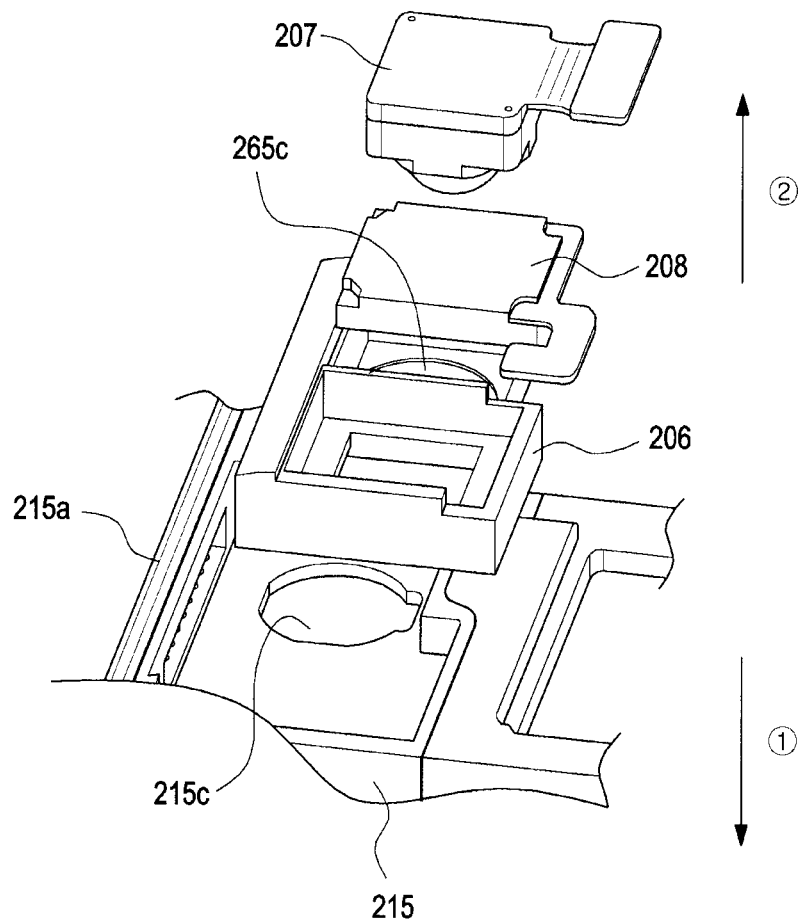
FIG. 7 is an exploded perspective view illustrating an acoustic component in an electronic device according to another of various embodiments of the present disclosure.
Figure 8:
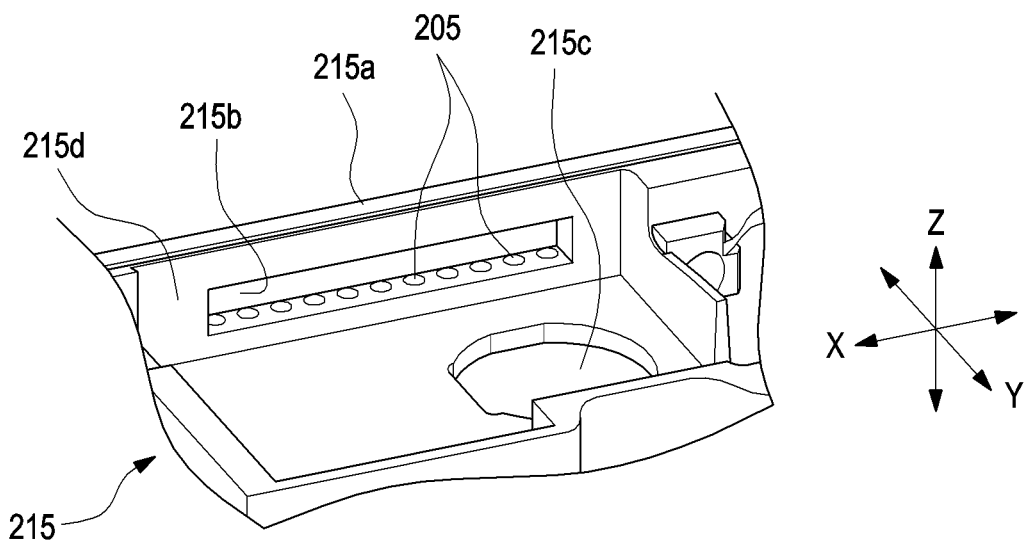
FIG. 8 is a perspective view illustrating a plurality of openings and a second passage in an electronic device according to another of various embodiments of the present disclosure.
Figure 9:
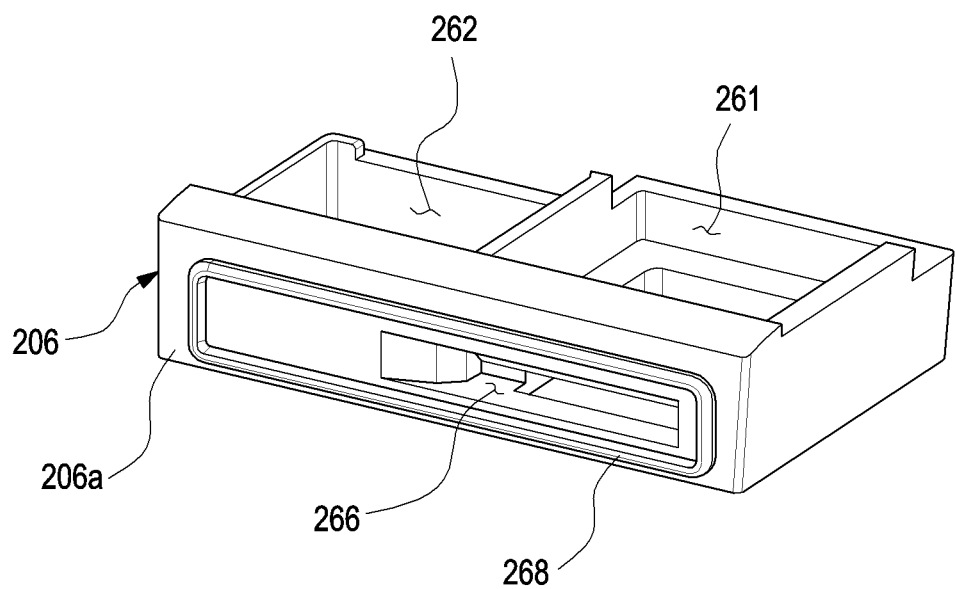
FIG. 9 is a perspective view illustrating a case in an electronic device according to another of various embodiments of the present disclosure.

FIG. 7 is an exploded perspective view illustrating an acoustic component in an electronic device according to another of various embodiments of the present disclosure. FIG. 8 is a perspective view illustrating a plurality of openings and a second passage in an electronic device according to another of various embodiments of the present disclosure. FIG. 9 is a perspective view illustrating a case in an electronic device according to another of various embodiments of the present disclosure.

Referring to FIGS. 7, 8 and 9, an electronic device according to another of various embodiments of the present disclosure may include a housing 215, an acoustic component 208, and a camera 207. A detailed description of components identical or similar to those of the foregoing embodiment will not be provided herein. The housing 215 illustrated in FIGS. 7, 8 and 9 may be a part of the housing 101 illustrated in FIG. 4. In FIGS. 8 and 9, the Z axis may be parallel to the first and second directions ① and ② illustrated in FIG. 7, the Y axis may be directed perpendicularly to the Z axis, and the X axis may be directed perpendicularly to both the Y and Z axes.

The acoustic component 208 may be disposed between a first surface (101 in FIG. 1) of the housing 215 and a second surface (102 in FIG. 2) of the housing 215. According to various embodiments of the present disclosure, the acoustic component 208 may be a receiver that outputs sound, not limited to a speaker that directly generates sound.

To generate sound, a diaphragm of the acoustic component 208 may move in the first direction ① or the second direction ②. Sound generated from the diaphragm may move in at least one of the first direction ① or the second direction ②.

A case 206 may provide a first accommodation space 261 in which the acoustic component 208 is accommodated, and a second accommodation space 262 in which the camera 207 is accommodated. With the acoustic component 208 and the camera 207 accommodated in the case 206, the case 206 may be mounted fixedly in the housing 215. A first through hole 265c is formed on the case 206, so that the image sensor of the camera 207 may face in the first direction ①.

A plurality of openings 205 may be formed along a first-axis direction (e.g., an X-axis direction) on an end 215a. A groove 215b may be formed on the end 215a of the housing 215, to connect to the plurality of openings 205 arranged along the first-axis direction (the X-axis direction). The groove 215b functions as a passage through which sound passes, and the openings 205 may be arranged at the center of the mobile communication terminal in view of the groove 215b and the acoustic component 208. The groove 215b may correspond to a later-described second passage. The housing 215 may support the case 206. As a second through hole 215c corresponding to the first through hole 265c may be formed in the housing 215, the image sensor of the camera 207 may face in the first direction ①.

Once the case 206 is mounted in the housing 215, an outer side surface 206a of the case 206 may be brought into contact with an inner side surface 215d of the housing 215. An opening 266 may be formed on the outer side surface 206a of the case 206. The opening 266 may connect between the first accommodation space 261 and the groove 215b. A sealing member 268 may be formed between the outer side surface 265 of the case 206 and the housing 215. The sealing member 268 may prevent the introduction of external foreign materials into the housing 215 through the plurality of openings 205. The sealing member 268 may block sound transferred to the groove 215d through the opening 266 from moving into the housing 215.

Figure 10:
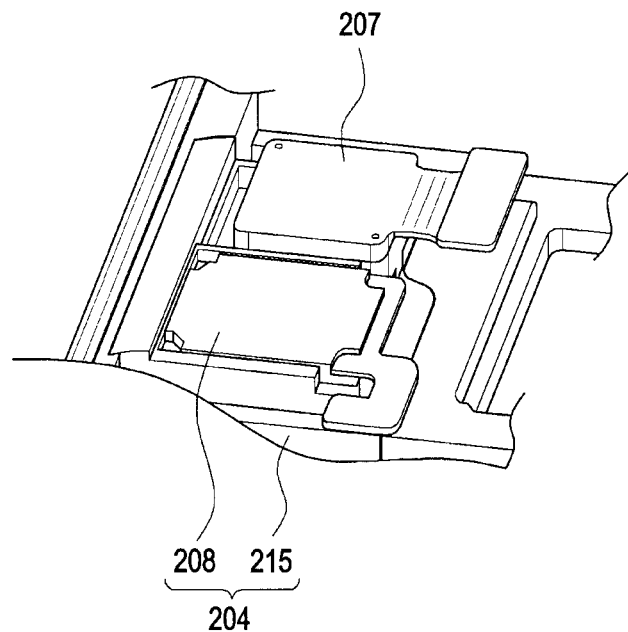
FIG. 10 is a perspective view illustrating an assembly of components of an acoustic component in an electronic device according to another of various embodiments of the present disclosure.
Figure 11:
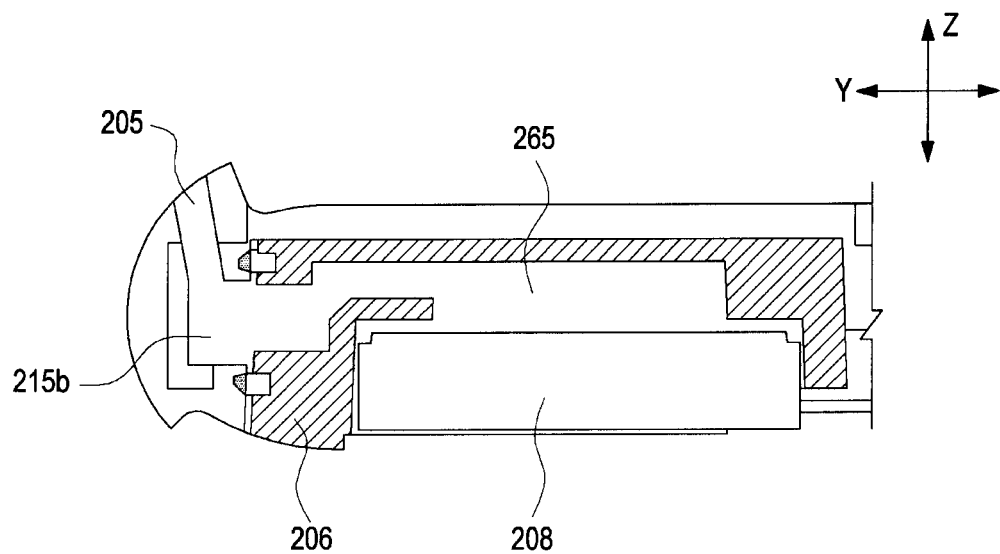
FIG. 11 is a sectional view illustrating an assembly of components of an acoustic component in an electronic device according to another of various embodiments of the present disclosure.

FIG. 10 is a perspective view illustrating an assembly of components of an acoustic component in an electronic device according to another of various embodiments of the present disclosure. FIG. 11 is a sectional view illustrating an assembly of components of an acoustic component in an electronic device according to another of various embodiments of the present disclosure.

Referring to FIGS. 10 and 11, the acoustic component 208 in the electronic device according to another of various embodiments of the present disclosure may include a first passage 265 and the second passage 215b.

The first passage 265 may be formed along a third direction (e.g., a Y-axis direction) substantially perpendicular to the first direction (① in FIG. 1). Sound generated from the diaphragm of the acoustic component 208 may pass through the first passage 265.

The second passage 215b may be formed along a fourth direction (e.g., the X-axis direction) different from the third direction, and communicate with the first passage 265.

Figure 12:
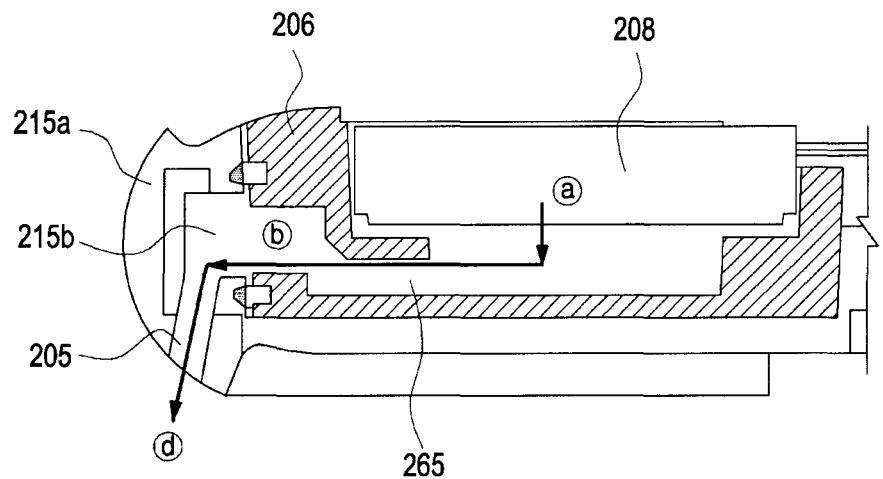
FIG. 12 is a view illustrating an assembly of components of an acoustic component in an electronic device according to another of various embodiments of the present disclosure.
Figure 13:
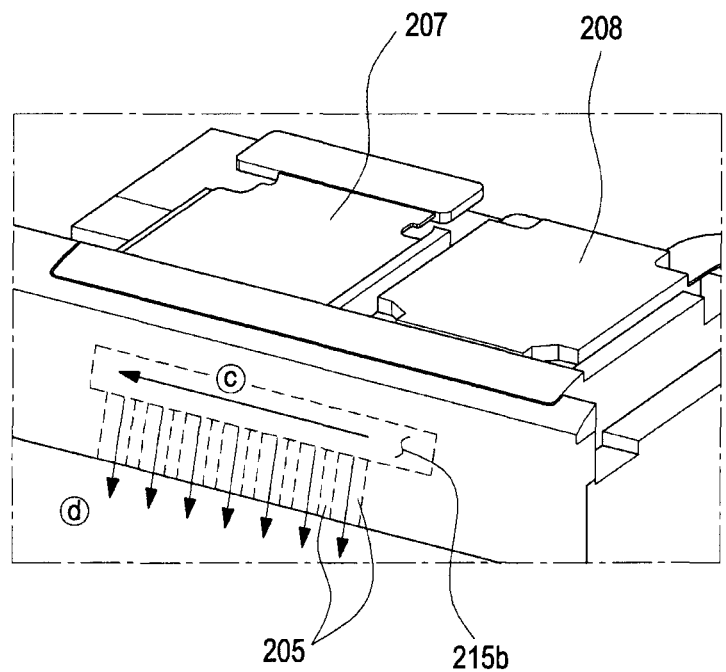
FIG. 13 is a perspective view illustrating passages through which sound is transferred in an acoustic component of an electronic device according to another of various embodiments of the present disclosure.

FIG. 12 is a perspective view illustrating an assembly of components of an acoustic component in an electronic device according to another of various embodiments of the present disclosure. FIG. 13 is a perspective view illustrating passages in which sound is transferred in an acoustic component of an electronic device according to another of various embodiments of the present disclosure.

Referring to FIGS. 12 and 13, the diaphragm of the acoustic component 208 may generate sound in a first direction ⓐ (e.g., the first direction ① in FIG. 1).

The sound generated from the diaphragm may move through the first passage 265 formed along a third direction ⓑ and the second passage 215b formed along a fourth direction ⓒ, and then may be radiated to the outside through the plurality of openings 205 formed along a fifth direction ⓓ. The sound may be radiated to the outside through at least a part of the plurality of openings 205 along the second passage 215b, not through only a part of the plurality of openings 205. According to various embodiments of the present disclosure, the fifth direction ⓓ may be substantially identical to the first direction ⓐ (e.g., the first direction ① in FIG. 1).

Figure 14:
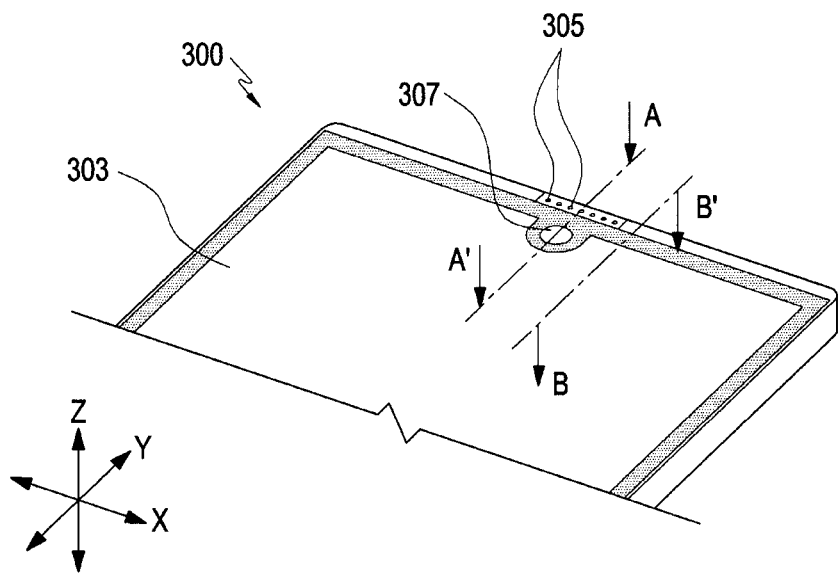
FIG. 14 is a perspective view illustrating a part of an electronic device according to another of various embodiments of the present disclosure.
Figure 15:
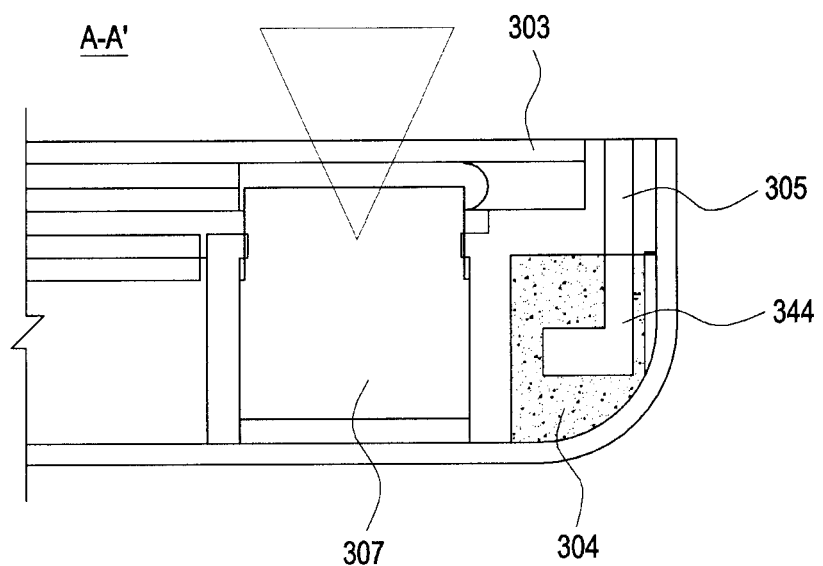
FIG. 15 is a sectional view illustrating the part of the electronic device illustrated in FIG. 14, taken along line A-A'.
Figure 16:
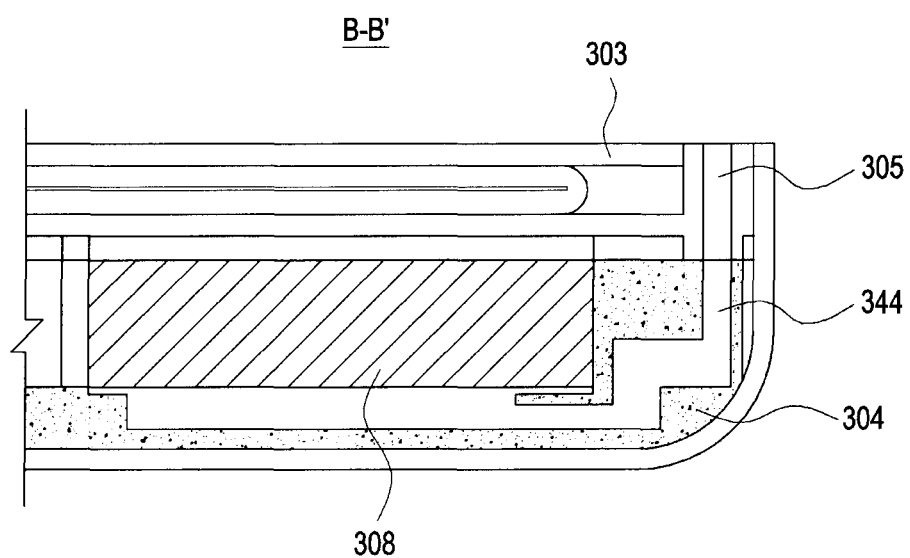
FIG. 16 is a sectional view illustrating the part of the electronic device illustrated in FIG. 14, taken along line B-B'.

FIG. 14 is a perspective view illustrating a part of an electronic device according to another of various embodiments of the present disclosure. FIG. 15 is a sectional view illustrating the part of the electronic device illustrated in FIG. 14, taken along line A-A'. FIG. 16 is a sectional view illustrating the part of the electronic device illustrated in FIG. 14, taken along line B-B'.

Referring to FIGS. 14, 15 and 16, an electronic device 300 according to another of various embodiments of the present disclosure may include a front cover 303, a plurality of openings 305, and a camera 307. A detailed description of components identical or similar to those of the foregoing embodiments will not be provided herein.

The plurality of openings 305 may be arranged along a first-axis (e.g., X-axis) direction, and the center of the camera 307 may be positioned in a second-axis (e.g., Y-axis) direction perpendicular to the first-axis (e.g., X-axis) direction from the center one of the plurality of openings 305.

An acoustic component 308 including a diaphragm may be positioned apart from the camera 307, along the first-axis (e.g., X-axis) direction. Although the acoustic component 308 is not directly connected to the plurality of openings 305, sound generated from the acoustic component 308 may be transferred to the plurality of openings 305 through a passage 344 in the acoustic component (308).

Figure 17A:
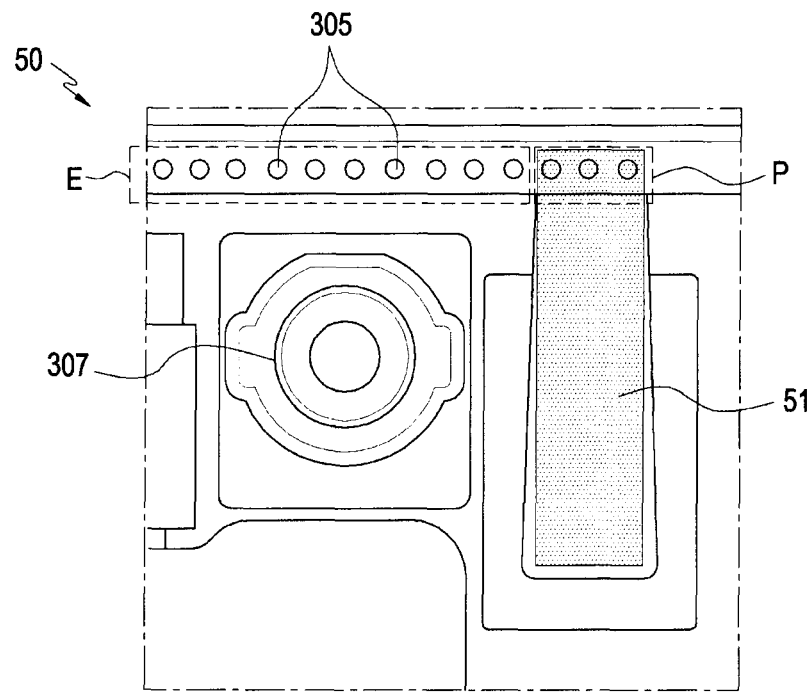
FIG. 17a is a view illustrating an acoustic component connected only to a part of a plurality of openings.
Figure 17B:
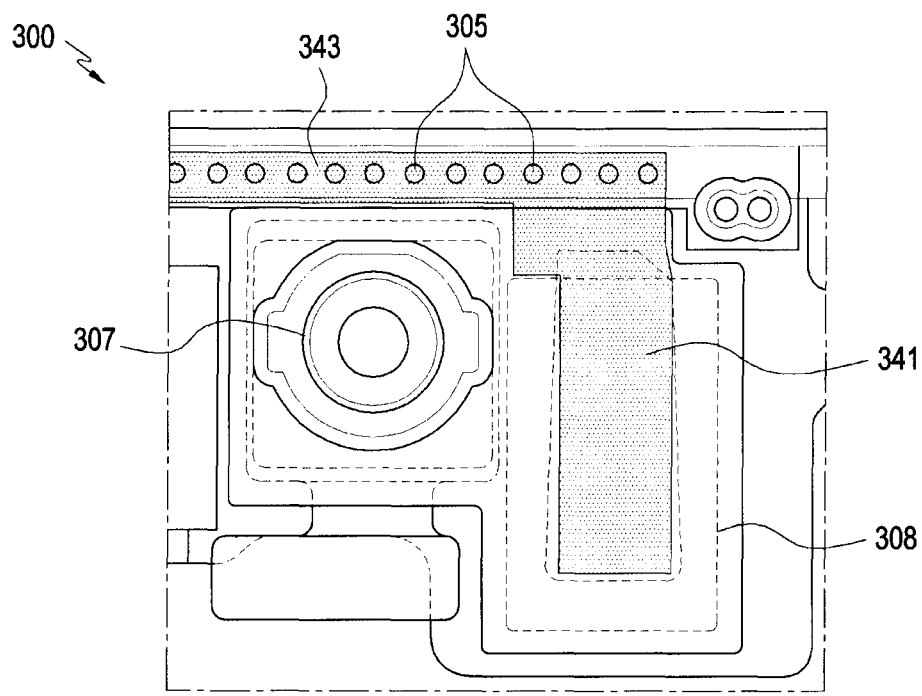
FIG. 17b is a view illustrating an acoustic component connected to all of a plurality of openings in an electronic device according to various embodiments of the present disclosure.
Figure 17C:
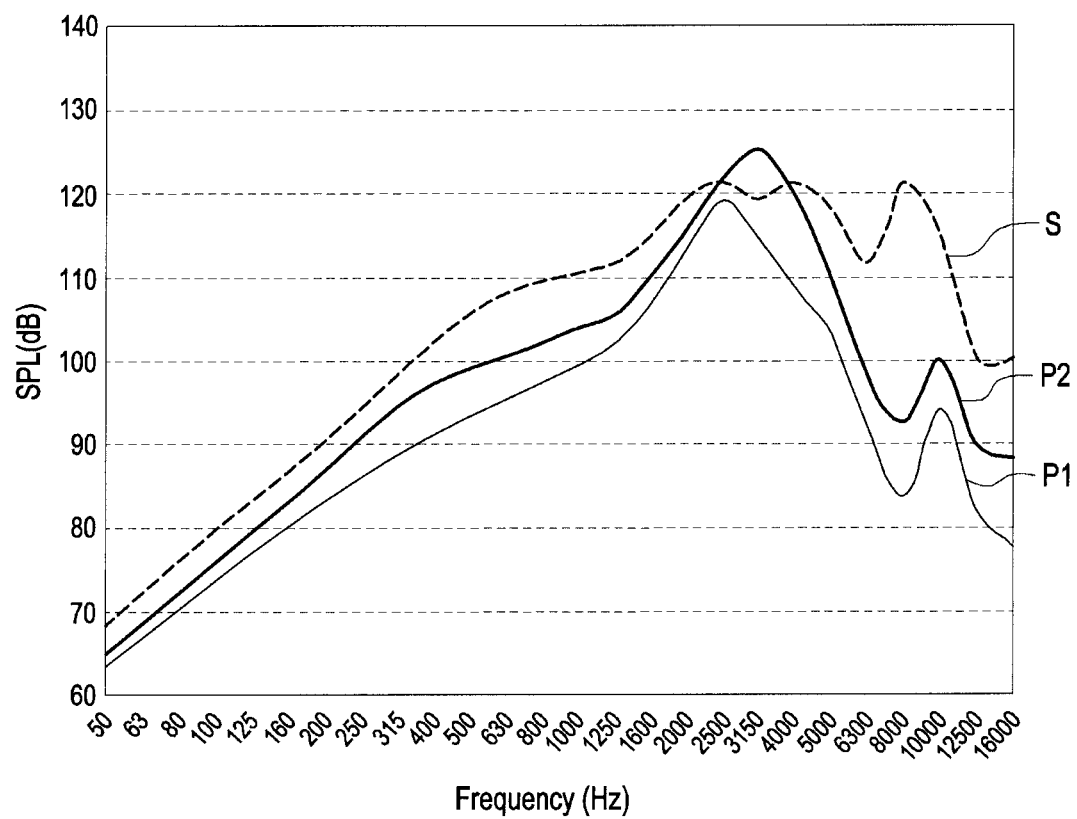
FIG. 17c is a graph illustrating volume characteristics of sound in an electronic device according to various embodiments of the present disclosure.
Figure 17D:
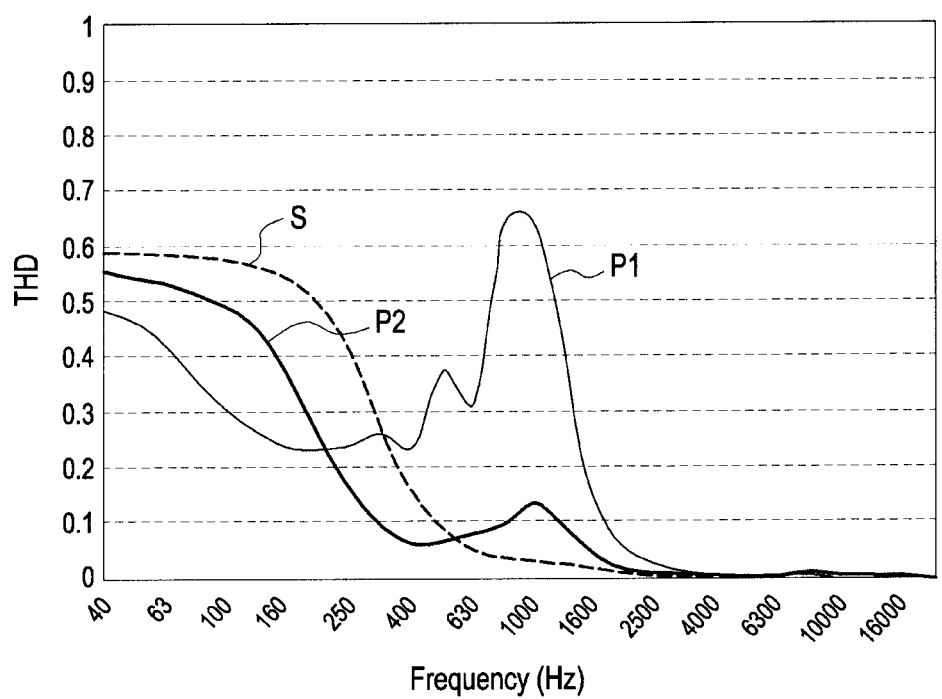
FIG. 17d is a graph illustrating quality characteristics of sound in an electronic device according to various embodiments of the present disclosure.

FIG. 17a is a view illustrating an acoustic component connected only to a part of a plurality of openings. FIG. 17b is a view illustrating an acoustic component connected to all of a plurality of openings in an electronic device according to various embodiments of the present disclosure. FIG. 17c is a graph illustrating volume characteristics of sound in an electronic device according to various embodiments of the present disclosure. FIG. 17d is a graph illustrating quality characteristics of sound in an electronic device according to various embodiments of the present disclosure.

With reference made to FIGS. 17a to 17d, an electronic device 50 (hereinafter, referred to as a second electronic device) in which an acoustic component is connected only to a part of a plurality of openings will be compared with the electronic device 300 according to various embodiments of the present disclosure.

The second electronic device 50 may include an acoustic component 51 (hereinafter, referred to a second acoustic component) that connects a diaphragm generating sound to openings in a first area P among the plurality of openings 305. As the second acoustic component 51 is connected only to a part of openings in a second area E among the plurality of openings 305, the openings of the second area E may radiate no sound or weak sound, whereas the openings of the first area P may radiate sound.

The acoustic component of the electronic device 300 according to various embodiments of the present disclosure may be connected to all of the plurality of openings 305.

The graph of FIG. 17c may represent the pressures (SPL in dB) of sound radiated through the openings in a frequency range of 50 Hz to 16000 Hz. In FIG. 17c, S may represent the pressures of sound generated from the diaphragm and directly radiated through the plurality of openings. In FIG. 17c, P1 may represent the pressures of sound radiated through the acoustic component 51 of the second electronic device. In FIG. 17c, P2 may represent the pressures of sound radiated through the acoustic component of the electronic device according to various embodiments of the present disclosure.

It may be noted that P1 is lower than S across a total frequency range. As noted, P1 is much lower than S in a high frequency area (e.g., 6300 Hz to 16000 Hz) of the total frequency range. Since sound radiated through the acoustic component 51 of the second electronic device is not radiated through all of the openings in the second area E, P1 may be lower than S.

It may be noted that P2 is higher than P1 across the total frequency range. Since the acoustic component 308 of the electronic device according to various embodiments of the present disclosure radiates sound through all of the plurality of openings 305, P2 may be higher than P1.

The graph of FIG. 17d may represent the qualities (total harmonic distortions (THDs)) of sound radiated through openings in a frequency range of 50 Hz to 16000 Hz. In FIG. 17d, S may represent the qualities of sound generated from the diaphragm and radiated directly through the plurality of openings. In FIG. 17d, P1 may represent the THDs of sound radiated through the acoustic component 51 of the second electronic device. P2 may represent the THDs of sound radiated through the acoustic component of the electronic device according to various embodiments of the present disclosure. As sound has a higher THD, the sound may include more distortion.

It may be noted that P1 is higher than S in an intermediate frequency range (e.g., 400 Hz to 2500 Hz). Since sound radiated through the acoustic component 51 of the second electronic device is not radiated through the openings in the second area E, P1 may be higher than S.

It may be noted that P2 is lower than P1 in 650 Hz to 1600 Hz in an intermediate frequency area (e.g., 400 Hz to 2500 Hz). In the electronic device according to various embodiments of the present disclosure, the acoustic component 308 radiates sound through all of the plurality of openings 305, thereby reducing radiation of distorted sound.

Figure 18A:
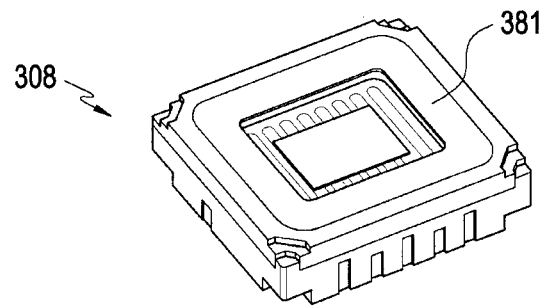
FIG. 18a is a perspective view illustrating an acoustic component in an electronic device according to another of various embodiments of the present disclosure.
Figure 18B:
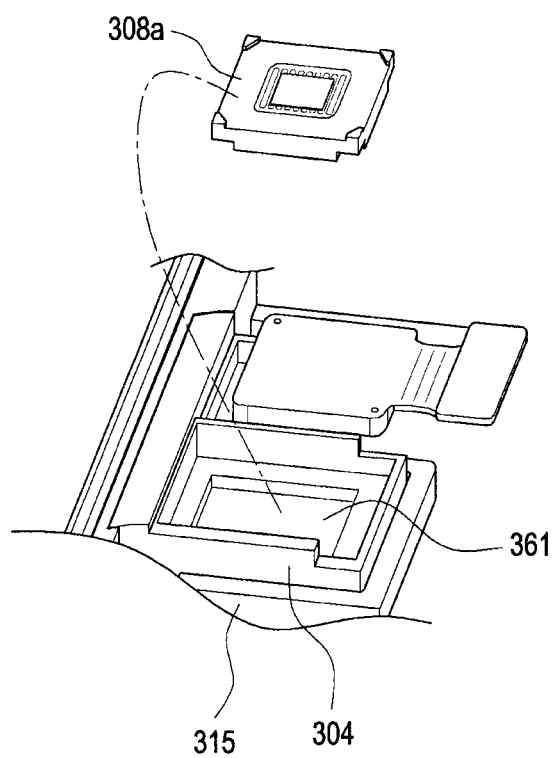
FIG. 18b is a perspective view illustrating an acoustic component engaged with a case in an electronic device according to another of various embodiments of the present disclosure.

FIG. 18a is a perspective view illustrating an acoustic component in an electronic device according to another of various embodiments of the present disclosure. FIG. 18b is a perspective view illustrating an acoustic component engaged with a case in an electronic device according to another of various embodiments of the present disclosure.

Referring to FIGS. 18a and 18b, an electronic device according to another of various embodiments of the present disclosure may include the acoustic component 308 with a grill 381. The grill 381 may be formed on the front surface of the acoustic component 308, and thus protect the acoustic component 308.

According to various embodiments of the present disclosure, an acoustic component 308a may not include the grill 381. For example, with the grill 381 removed, the acoustic component 308a may be accommodated in a first accommodation space 361 of a case 304.

As the acoustic component 308a does not include the grill 381, the acoustic component 308a may keep as much space as the thickness of the grill 381 empty in the first accommodation space 361. Securing of the empty space in the first accommodation space 361 may lead to improvement of the high-frequency band performance of sound generated from the diaphragm of the acoustic component 308.

Figure 19:
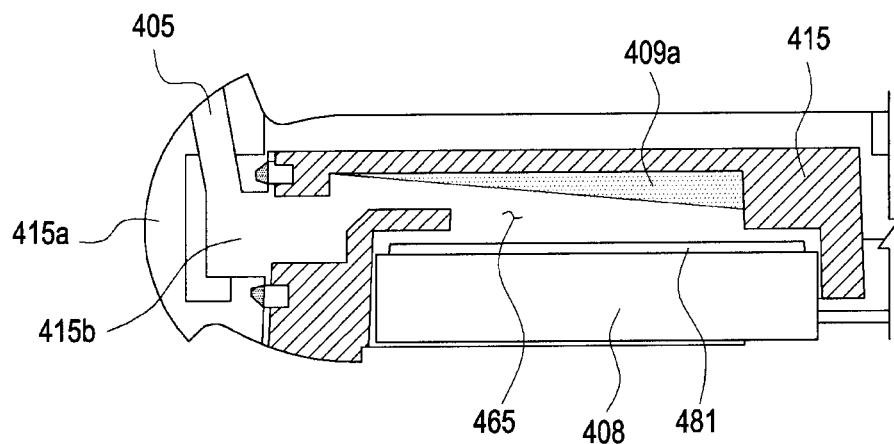
FIG. 19 is a sectional view illustrating an acoustic component in an electronic device according to another of various embodiments of the present disclosure.

FIG. 19 is a sectional view illustrating an acoustic component in an electronic device according to another of various embodiments of the present disclosure.

Referring to FIG. 19, an electronic device according to another of various embodiments of the present disclosure may include a case 415, an acoustic component 408, a plurality of openings 405, a first passage 465, a second passage 415b, and a reflector 409a. A detailed description of components identical or similar to those of the foregoing embodiments will not be provided herein.

The reflector 409a may be disposed in the first passage 465. The reflector 409a may inclinedly face a diaphragm 481 of the acoustic component 408. According to various embodiments of the present disclosure, the reflector 409a may be integrally formed with the case 415. The reflector 409a may reflect sound generated from the diaphragm 481 to the second passage 415b. For example, the sound reflected from the reflector 409a may be sound in a high frequency band with high linearity. Since the reflector 409a reflects the sound generated from the diaphragm 481, the pressure of sound in a high frequency band radiated from the plurality of openings 405 may be improved.

Figure 20:
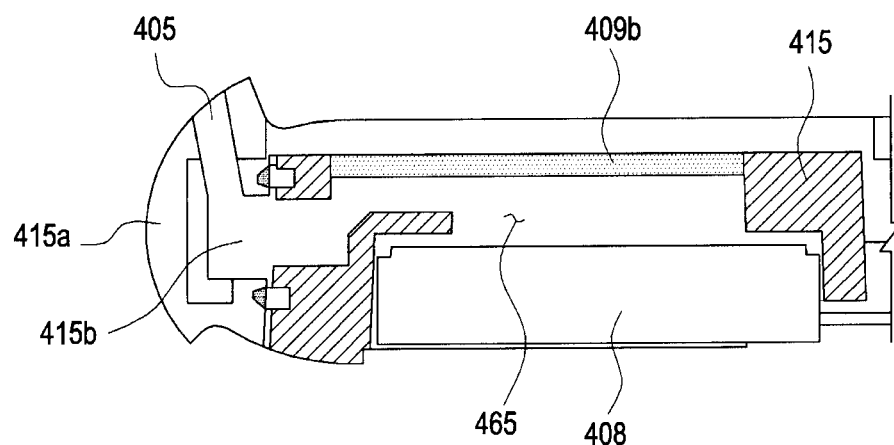
FIG. 20 is a sectional view illustrating an acoustic component in an electronic device according to another of various embodiments of the present disclosure.

FIG. 20 is a sectional view illustrating an acoustic component in an electronic device according to another of various embodiments of the present disclosure.

Referring to FIG. 20, an internal member 409b may be provided in the first passage 465, facing one surface of the diaphragm of an acoustic component 408, in parallel to the surface. The internal member 409b may be formed of stainless steel. According to various embodiments of the present disclosure, the internal member 409b may be formed of any of various metals, not limited to stainless steel.

According to various embodiment of the present disclosure, the interval member 409b may form a part of the case 415, thereby reducing the total height of the case 415.

Figure 21:
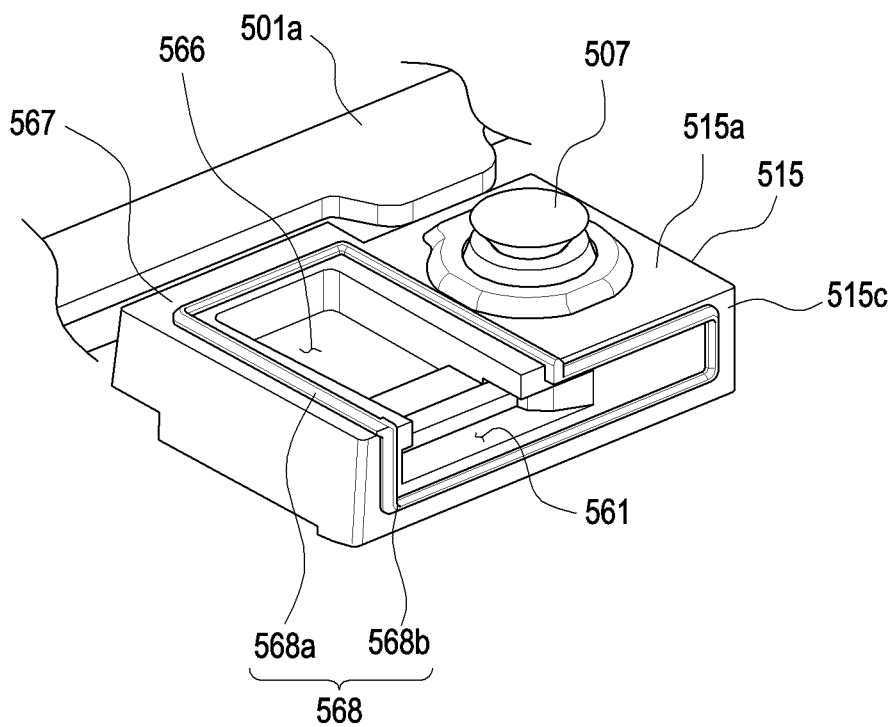
FIG. 21 is a perspective view illustrating an acoustic component in an electronic device according to another of various embodiments of the present disclosure.
Figure 22:
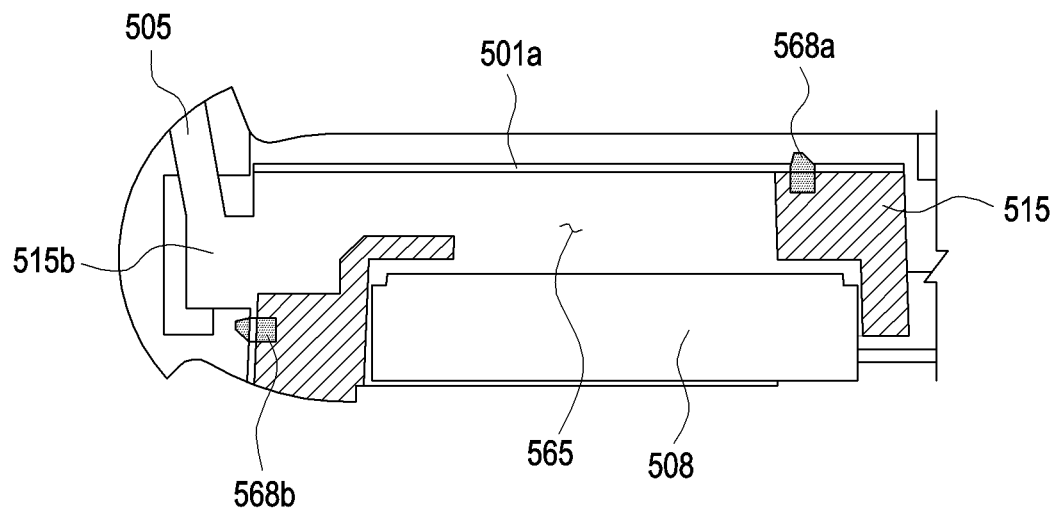
FIG. 22 is a sectional view illustrating an acoustic component in an electronic device according to another of various embodiments of the present disclosure.

FIG. 21 is a sectional view illustrating an acoustic component in an electronic device according to another of various embodiments of the present disclosure. FIG. 22 is a sectional view illustrating an acoustic component in an electronic device according to another of various embodiments of the present disclosure.

The electronic device according to another of various embodiments of the present disclosure may include a case 515, an acoustic component 508, a plurality of openings 505, a first passage 565, a second passage 515b, and a sealing member 568. A detailed description of components identical or similar to those of the foregoing embodiments will not be provided herein.

The case 515 may include a first accommodation space 566 that accommodates the acoustic component 508, and an opening 561 that connects the first passage 565 to the second passage 515b. The first accommodation space 566 may communicate with the opening 561.

The sealing member 568 may include a first sealing member 568a surrounding a part opened as the first accommodation space 566 on a top surface 515a of the case 515, and a second sealing member 568b surrounding the opening 561 on an outer side surface 515b of the case 515. The first sealing member 568a may be connected to the second sealing member 568b. The sealing member 568 may be formed of silicon or rubber. According to various embodiments of the present disclosure, the sealing member 568 may be a double-sided tape. Since the first sealing member 568a seals between the case 515 and a housing 501a, and the second sealing member 568b seals between the case 515 and the housing 501a, the introduction of foreign materials into the housing 501a through the plurality of openings 505 may be prevented.

Figure 23A:
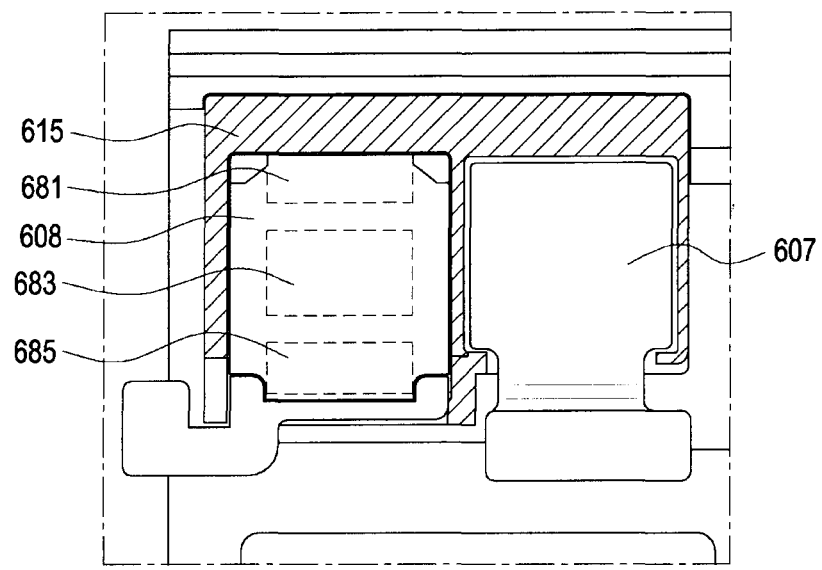
FIG. 23a is a front view illustrating arrangement of magnets in an acoustic component in an electronic device according to another of various embodiments of the present disclosure.
Figure 23B:
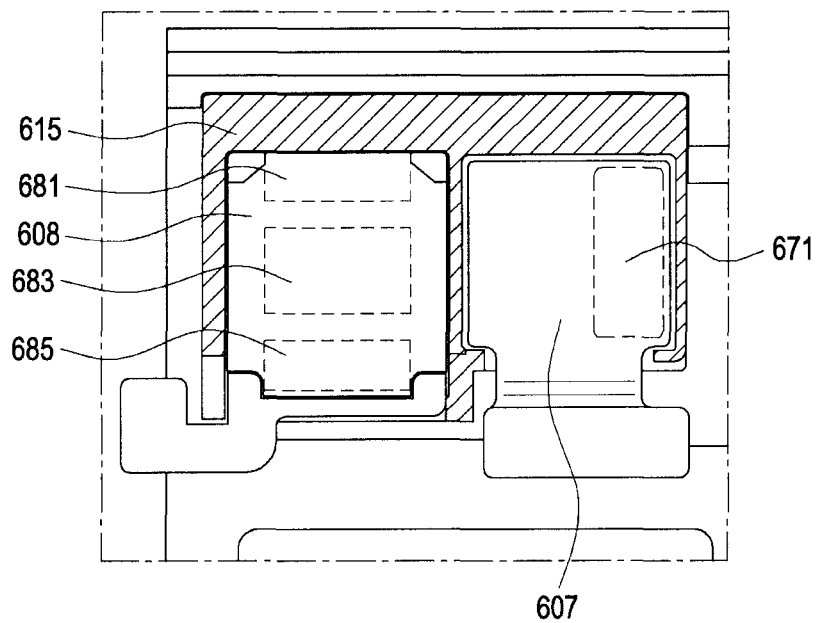
FIG. 23b is a front view illustrating arrangement of a magnet in a camera in an electronic device according to another of various embodiments of the present disclosure.

FIG. 23a is a front view illustrating arrangement of magnets in an acoustic component in an electronic device according to another of various embodiments of the present disclosure. FIG. 23b is a front view illustrating arrangement of a magnet in a camera in an electronic device according to another of various embodiments of the present disclosure.

Referring to FIGS. 23a and 23b, an electronic device according to another of various embodiments of the present disclosure may include a case 615, an acoustic component 608, and a camera 607. A detailed description of components identical or similar to those of the foregoing embodiments will not be provided herein.

The acoustic component 608 may include magnets 681, 683, and 685 for vibrating a diaphragm. The magnets 681, 683, and 685 may be arranged side by side. The magnets 681, 683, and 685 may be arranged in any of various manners that minimize the influence of a magnetic force on the adjacent camera 607.

The camera 607 may include a magnet 671 for auto focus control or tremor adjustment. For example, the magnet 671 may be an auto focus (AF) magnet.

Figure 24:
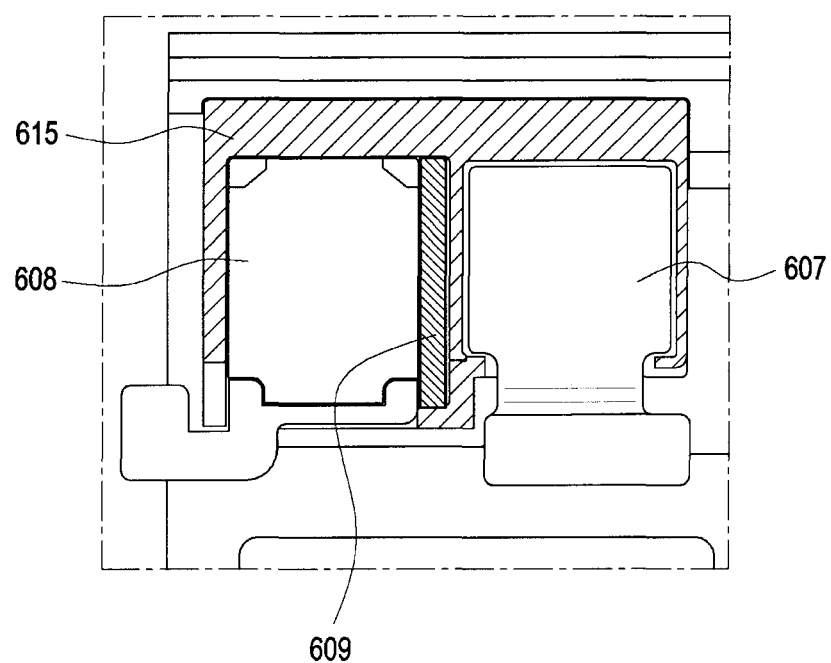
FIG. 24 is a front view illustrating an acoustic component in an electronic device according to another of various embodiments of the present disclosure.

The magnet 671 may be disposed as far as possible from the acoustic component 608. For example, the magnet 671 may be disposed adjacent to an edge of the camera 607, thus as far as possible from the acoustic component 608. FIG. 24 is a front view illustrating an acoustic component in an electronic device according to another of various embodiments of the present disclosure.

Referring to FIG. 24, a shielding member 609 may be provided between the acoustic component 608 and the camera 607 in the case 615. The shielding member 609 may contact the acoustic component 608, while being accommodated in the case 615. According to various embodiments, the shielding member 609 may surround the acoustic component 698. The shielding member 609 may be formed of stainless steel. According to various embodiments, the shielding member 609 may be formed of any of various materials that shield a magnetic force, not limited to stainless steel.

Figure 25:
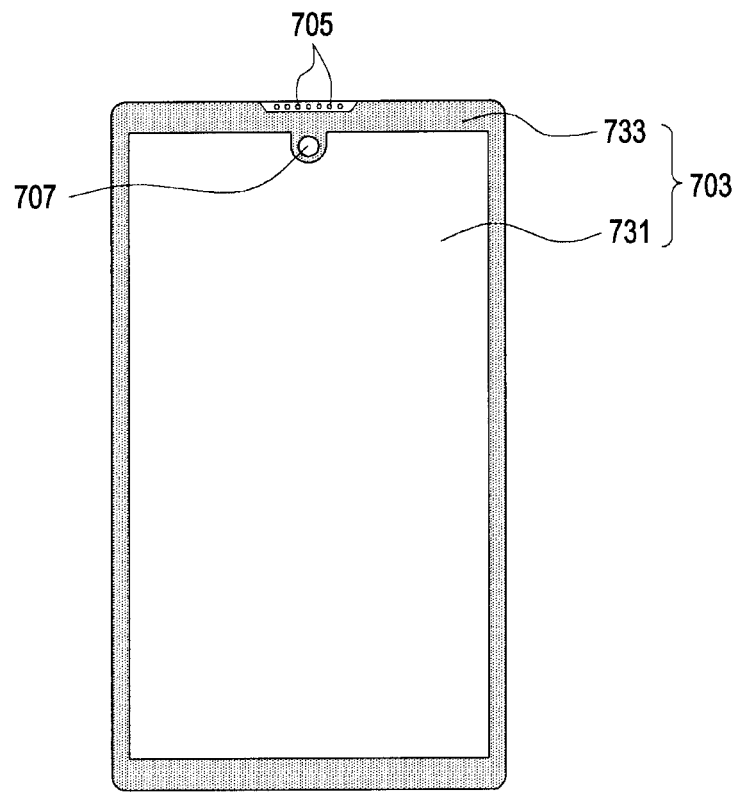
FIG. 25 is a front view illustrating an electronic device according to another of various embodiments of the present disclosure.
Figure 26:
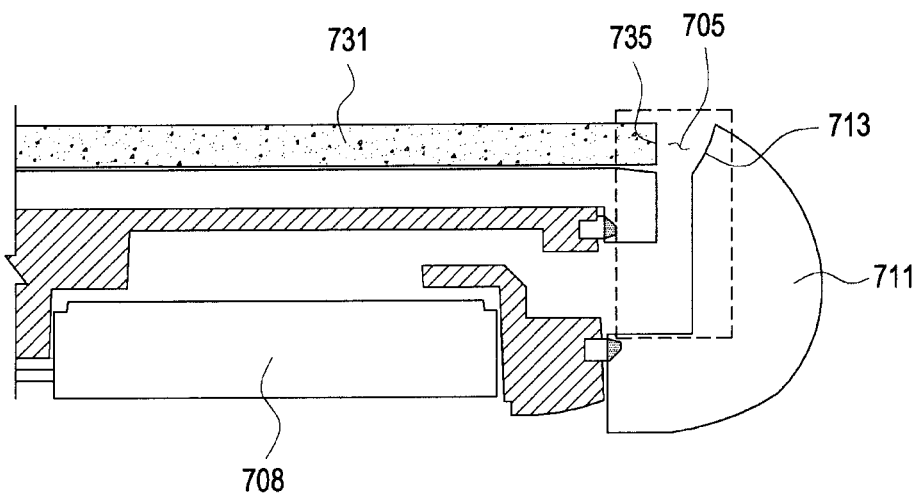
FIG. 26 is a sectional view illustrating an electronic device according to another of various embodiments of the present disclosure.

FIG. 25 is a front view illustrating an electronic device according to another of various embodiments of the present disclosure. FIG. 26 is a sectional view illustrating an electronic device according to another of various embodiments of the present disclosure.

Referring to FIGS. 25 and 26, an electronic device according to another of various embodiments of the present disclosure may include a first surface 703 of a housing 711, a plurality of openings 705, an acoustic component 708, and a camera 707. A detailed description of components identical or similar to those of the foregoing embodiments will not be provided herein.

The first surface 703 of the housing 711 may include a transparent part 731 on which a screen is output, and a bezel area 733 that hides wires transferring an electrical signal to a display. The transparent part 731 may be included in, for example, a front window.

The plurality of openings 705 may be formed in the bezel area 733. According to various embodiments, as illustrated in FIG. 26, the plurality of openings 705 may be formed between an edge 735 of the transparent part 731 and an edge 713 of the housing 711.

When seen from above the first surface of the housing, the acoustic component 708 may overlap with the transparent part 731. Since the acoustic component 708 is connected to the plurality of openings 705 through a passage formed in a case, the pressure and quality of sound radiated from the plurality of openings 705 may be secured stably.

Figure 27:
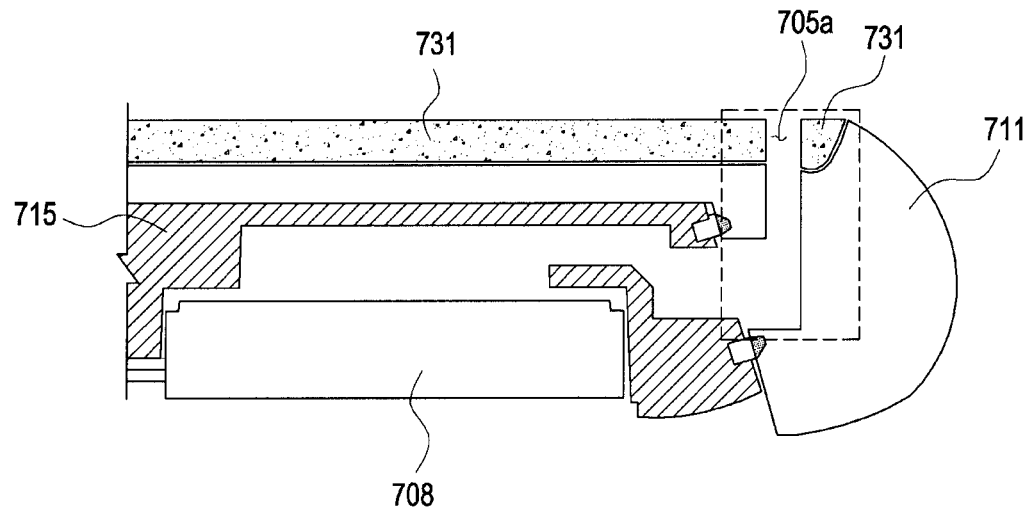
FIG. 27 is a sectional view illustrating an electronic device according to another of various embodiments of the present disclosure.

FIG. 27 is a sectional view illustrating an electronic device according to another of various embodiments of the present disclosure.

Referring to FIG. 27, according to various embodiments of the present disclosure, a plurality of openings 705a may be formed to penetrate through the transparent part 731. In the electronic device according to various embodiments of the present disclosure, as the plurality of openings 705a may be formed to penetrate through the transparent part 731, the whole first surface of a housing except for the plurality of openings 705a may be used as a display. Since the proportion of the display on the first surface increases, a large screen may be realized in the electronic device according to various embodiments of the present disclosure.

Figure 28:
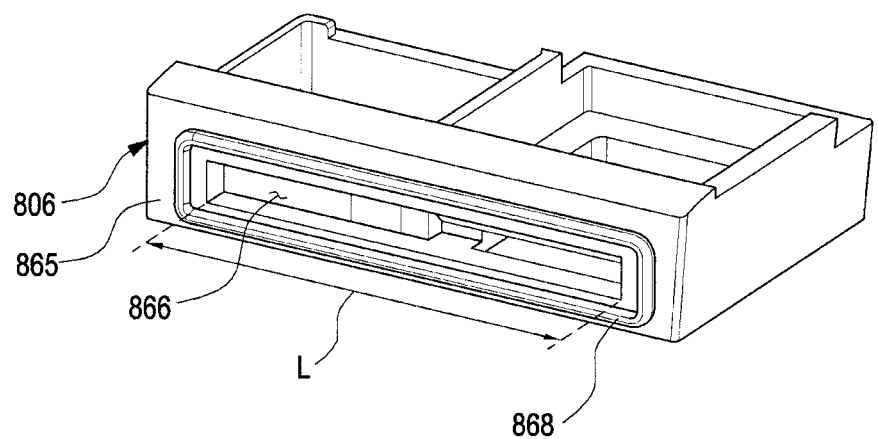
FIG. 28 is a perspective view illustrating an acoustic component according to another of various embodiments of the present disclosure.
Figure 29:
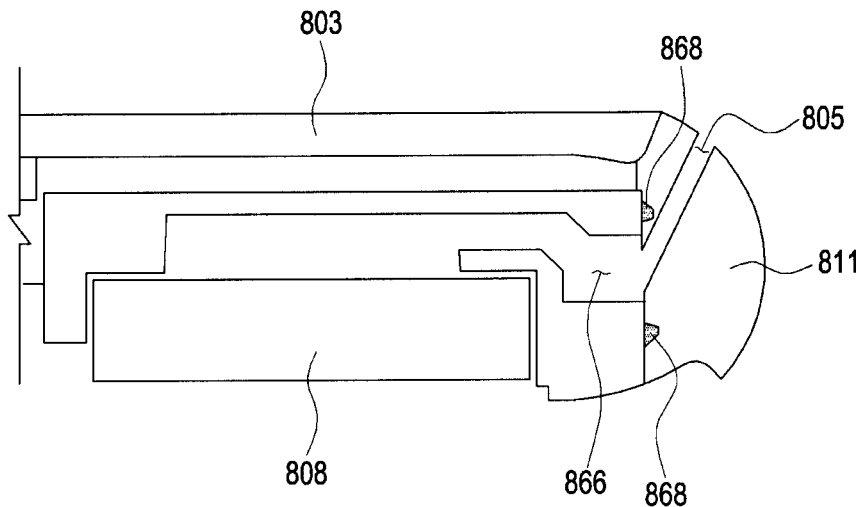
FIG. 29 is a sectional view illustrating an electronic device according to another of various embodiments of the present disclosure.

FIG. 28 is a perspective view illustrating an acoustic component according to another of various embodiments of the present disclosure. FIG. 29 is a sectional view illustrating an electronic device according to another of various embodiments of the present disclosure.

Referring to FIGS. 28 and 29, an electronic device according to another of various embodiments of the present disclosure may include a housing 811, an acoustic component 808, and a case 806. The following description focuses on a second passage, without a detailed description of components identical or similar to those of the foregoing embodiments.

A groove 866 communicating with a plurality of openings 805 may be formed in the case 806. The groove 866 may correspond to a second passage in which sound generated from the acoustic component 808 is transferred to the plurality of openings 805. The second passage 866 may have a width L corresponding to a length for which the plurality of openings 805 are arranged. Sound generated from the acoustic component 808 may be radiated to the outside through at least a part of the plurality of openings 805 along the second passage 866.

A sealing member 868 may be provided between an outer side surface 865 of the case 806 and the housing 811. The sealing member 868 may prevent the introduction of external foreign materials (e.g., water) into the housing 811 through the plurality of openings 805. The sealing member 868 may prevent sound from escaping between the case 806 and the housing 811.

According to various embodiments of the present disclosure, the acoustic component 806 may not be limited to providing the second passage 866 corresponding to the groove 866, and the sealing member 868 may form a space corresponding to the second passage 866 between the outer side surface 865 of the case 806 and the housing 811.

Figure 30:
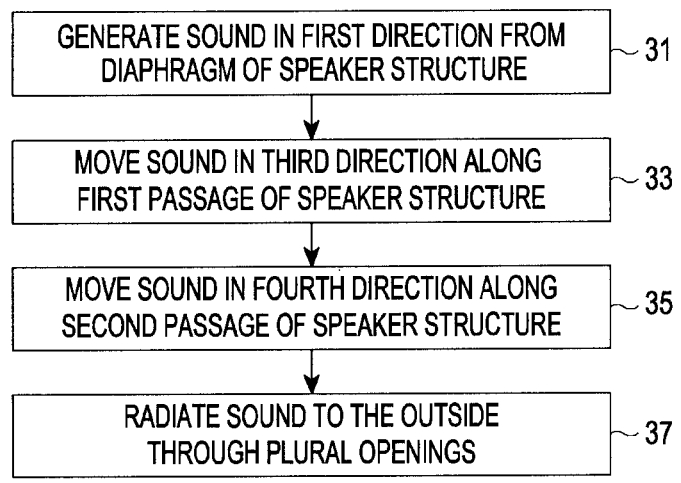
FIG. 30 is a flowchart illustrating a method of operating an electronic device according to various embodiments of the present disclosure.

FIG. 30 is a flowchart illustrating a method of operating an electronic device according to various embodiments of the present disclosure.

Referring to FIG. 30, in the method of operating an electronic device according to various embodiments of the present disclosure, sound may be generated in a first direction from a diaphragm of an acoustic component in operation 31. In operation 33, the sound may move in a third direction along a first passage of the acoustic component. In operation 35, the sound may move in a fourth direction along a second passage of the acoustic component. The sound may be radiated to the outside through a plurality of openings in operation 37.

As described before, according to various embodiments of the present disclosure, an electronic device may include a housing comprising a first surface facing in a first direction, and a second surface facing in a second direction opposite to the first direction, the first surface comprising an at least partially transparent part, and at least one opening formed adjacent to the at least partially transparent part, a camera positioned inside the housing, and comprising an image sensor facing in the first direction through the at least partially transparent part of the housing, an acoustic component disposed between the first surface and the second surface, and comprising a diaphragm configured to generate sound and move the sound in at least one of the first direction or the second direction, a first passage formed along a third direction substantially perpendicular to the first direction, to allow the sound to pass therethrough, and a second passage formed along a fourth direction different from the third direction, while connecting between the first passage and the at least one opening, a wireless communication circuit disposed inside the housing, and electrically connected to the acoustic component to provide a signal for sound to the acoustic component, a display exposed through the first surface, and disposed adjacent to the camera, and a processor disposed inside the housing, and electrically connected to the camera, the acoustic component, the wireless communication circuit, and the display.

According to various embodiments of the present disclosure, the housing may include a first peripheral portion, and a second peripheral portion longer than the first peripheral portion, and the at least one opening may be formed in the first peripheral portion, and connected to the second passage.

According to various embodiments of the present disclosure, sound generated in the first direction from the diaphragm may sequentially move through the first passage formed along the third direction, the second passage formed along the fourth direction, and the at least one opening formed along the first direction, and be radiated to an outside.

According to various embodiments of the present disclosure, an electronic device may include a housing comprising a first surface facing in a first direction, and a second surface facing in a second direction opposite to the first direction, the first surface comprising an at least partially transparent part, at least one opening formed adjacent to the at least partially transparent part, a first peripheral portion, and a second peripheral portion longer than the first peripheral portion, a camera positioned inside the housing, adjacent to the peripheral portion, and comprising an image sensor facing in the first direction through the at least partially transparent part of the housing, a display exposed through the first surface, and comprising an edge extending in substantially parallel to the first peripheral portion and apart from an edge of the first peripheral portion by a distance of 0.5 mm to 6 mm, an acoustic component disposed between the first surface and the second surface, fluidly connected to the opening, and comprising a diaphragm located within a range of 0.2 mm to 0.6 mm from the camera, when seen from above the first surface, a wireless communication circuit disposed inside the housing, and electrically connected to the acoustic component to provide a signal for sound to the acoustic component, and a processor disposed inside the housing, and electrically connected to the camera, the acoustic component, the wireless communication circuit, and the display.

According to various embodiments of the present disclosure, an electronic device may include a housing comprising a first surface facing in a first direction, and a second surface facing in a second direction opposite to the first direction, the first surface comprising an at least partially transparent part, at least one opening formed adjacent to the at least partially transparent part, a first peripheral portion, and a second peripheral portion longer than the first peripheral portion, a camera positioned inside the housing, adjacent to the first peripheral portion, and comprising an image sensor facing in the first direction through the at least partially transparent part of the housing, a display exposed through the first surface, and extending in substantially parallel to the first peripheral portion, an acoustic component disposed between the first surface and the second surface, connected to the at least one opening, and comprising a diaphragm located to overlap at least partially with the display, when seen from above the first surface, a wireless communication circuit disposed inside the housing, and electrically connected to the acoustic component to provide a signal for sound to the acoustic component, and a processor disposed inside the housing, and electrically connected to the camera, the acoustic component, the wireless communication circuit, and the display.

According to various embodiments of the present disclosure, an electronic device may include a housing comprising a plurality of openings, and an acoustic component comprising a diaphragm accommodated in the housing, disposed apart from the plurality of openings, and generating sound in a first direction, and a passage formed between the plurality of openings and the diaphragm, and allowing the sound generated from the diaphragm to pass therethrough.

According to various embodiments of the present disclosure, the plurality of openings may be arranged in a first-axis direction, and a center of the diaphragm may be apart from a center opening among the plurality of openings in a second-axis direction perpendicular to the first-axis direction.

According to various embodiments of the present disclosure, the passage may include a first passage formed along the second-axis direction, and a second passage formed along the first-axis direction, connecting the first passage to the plurality of openings, and outputting the sound generated from the diaphragm to an outside of the housing through the plurality of openings.

According to various embodiments of the present disclosure, a reflector inclinedly facing the diaphragm may be provided in the first passage.

According to various embodiments of the present disclosure, an internal member may be provided in the second passage, facing one surface of the diaphragm in parallel.

According to various embodiments of the present disclosure, the housing may include a first surface facing in a first direction, a second surface facing in a second direction opposite to the first direction, a first peripheral portion positioned on the first surface, and a second peripheral portion positioned on the first surface, and longer than the first peripheral portion. The plurality of openings may be formed in the first peripheral portion.

According to various embodiments of the present disclosure, the plurality of openings may be formed at a center of the first peripheral portion.

According to various embodiments of the present disclosure, the acoustic component may include a case accommodating the diaphragm, and magnets accommodated in the case, and transferring vibrations to the diaphragm.

According to various embodiments of the present disclosure, the electronic device may further include a camera positioned at the center of the first peripheral portion, and the plurality of openings may be disposed between an edge of the first peripheral portion and the camera.

According to various embodiments of the present disclosure, the electronic device may further include a display exposed through the first surface, and at least a part of the camera may be surrounded by the display.

According to various embodiments of the present disclosure, the case may be provided with a camera accommodation portion that accommodates the camera.

According to various embodiments of the present disclosure, the electronic device may further include a sealing member sealing between an outer side surface of the case and an inner side surface of the housing, and blocking introduction of a foreign material into the housing through the plurality of openings.

According to various embodiments of the present disclosure, a shielding member may be provided in the case between the acoustic component and the camera and shields a magnetic force between the acoustic component and the camera.

According to various embodiments of the present disclosure, the electronic device may further include a display exposed through the first surface, and the plurality of openings may be formed to penetrate through the display.

In an electronic device according to various embodiments of the present disclosure, a diaphragm of an acoustic component may generate sound in a first direction, and the sound may move in a third direction along a first passage of the acoustic component, in a fourth direction along a second passage of the acoustic component, and radiate to the outside through a plurality of openings.

While the present disclosure has been described with reference to specific embodiments, it is apparent to those skilled in the art that many modifications and variations can be made without departing from the scope and spirit of the present disclosure.

What is claimed is:

1. An electronic device comprising:
  a housing comprising a first surface facing in a first direction, and a second surface facing in a second direction opposite to the first direction, the first surface comprising an at least partially transparent part, and at least one opening formed adjacent to the at least partially transparent part;
  a camera positioned inside the housing, and comprising an image sensor facing in the first direction through the at least partially transparent part of the housing;
  an acoustic component disposed between the first surface and the second surface, and comprising a diaphragm configured to generate sound and move the sound in at least one of the first direction or the second direction, a first passage formed along a third direction substantially perpendicular to the first direction, to allow the sound to pass therethrough, and a second passage formed along a fourth direction different from the third direction, while connecting between the first passage and the at least one opening;
  a wireless communication circuit disposed inside the housing, and electrically connected to the acoustic component to provide a signal for sound to the acoustic component;
  a display exposed through the first surface, and disposed adjacent to the camera; and
  a processor disposed inside the housing, and electrically connected to the camera, the acoustic component, the wireless communication circuit, and the display.

2. The electronic device of claim 1, wherein the housing comprises:
  a first peripheral portion; and
  a second peripheral portion longer than the first peripheral portion, and
  wherein the at least one opening is formed in the first peripheral portion, and connected to the second passage.

3. The electronic device of claim 1, wherein sound generated in the first direction from the diaphragm sequentially moves through the first passage formed along the third direction, the second passage formed along the fourth direction, and the at least one opening formed along the first direction, and is radiated to an outside.

4. An electronic device comprising:
  a housing comprising a first surface facing in a first direction, and a second surface facing in a second direction opposite to the first direction, the first surface comprising an at least partially transparent part, at least one opening formed adjacent to the at least partially transparent part, a first peripheral portion, and a second peripheral portion longer than the first peripheral portion;
  a camera positioned inside the housing, adjacent to the first peripheral portion, and comprising an image sensor facing in the first direction through the at least partially transparent part of the housing;
  a display exposed through the first surface, and comprising an edge extending in substantially parallel to the first peripheral portion and apart from an edge of the first peripheral portion by a distance of 0.5 mm to 6 mm;
  an acoustic component disposed between the first surface and the second surface, connected to the at least one opening, and located within a range of 0.2 mm to 0.6 mm from the camera, when seen from above the first surface;
  a wireless communication circuit disposed inside the housing, and electrically connected to the acoustic component to provide a signal for sound to the acoustic component; and
  a processor disposed inside the housing, and electrically connected to the camera, the acoustic component, the wireless communication circuit, and the display.

5. An electronic device comprising:
  a housing comprising a first surface facing in a first direction, and a second surface facing in a second direction opposite to the first direction, the first surface comprising an at least partially transparent part, at least one opening formed adjacent to the at least partially transparent part, a first peripheral portion, and a second peripheral portion longer than the first peripheral portion;
  a camera positioned inside the housing, adjacent to the first peripheral portion, and comprising an image sensor facing in the first direction through the at least partially transparent part of the housing;
  a display exposed through the first surface, and extending in substantially parallel to the first peripheral portion;
  an acoustic component disposed between the first surface and the second surface, connected to the at least one opening, and comprising a diaphragm located to overlap at least partially with the display, when seen from above the first surface;
a wireless communication circuit disposed inside the housing, and electrically connected to the acoustic component to provide a signal for sound to the acoustic component; and
a processor disposed inside the housing, and electrically connected to the camera, the acoustic component, the wireless communication circuit, and the display.

6. An electronic device comprising:
a housing comprising a plurality of openings and a camera; and
an acoustic component comprising a diaphragm accommodated in the housing, disposed apart from the plurality of openings, and generating sound in a first direction, and
a passage formed between the plurality of openings and the acoustic component, and allowing the sound generated from the diaphragm to pass therethrough.

7. The electronic device of claim 6, wherein the plurality of openings are arranged in a first-axis direction, and a center of the acoustic component is apart from a center opening among the plurality of openings in a second-axis direction perpendicular to the first-axis direction.

8. The electronic device of claim 7, wherein the passage comprises:
a first passage formed along the second-axis direction; and
a second passage formed along the first-axis direction, connecting the first passage to the plurality of openings, and outputting the sound generated from the diaphragm to an outside of the housing through the plurality of openings.

9. The electronic device of claim 8, wherein a reflector inclinedly facing the diaphragm is provided in the first passage.

10. The electronic device of claim 8, wherein an internal member is provided in the second passage, facing one surface of the diaphragm in parallel.

11. The electronic device of claim 6, wherein the housing comprises:
a first surface facing in a first direction;
a second surface facing in a second direction opposite to the first direction;
a first peripheral portion positioned on the first surface; and
a second peripheral portion positioned on the first surface, and longer than the first peripheral portion,
wherein the plurality of openings are formed in the first peripheral portion, and
wherein the acoustic component comprises:
a case accommodating the diaphragm; and
magnets accommodated in the case, and transferring vibrations to the diaphragm.

12. The electronic device of claim 11, wherein the camera is configured to be positioned at a center of the first peripheral portion,
wherein the plurality of openings are disposed between an edge of the first peripheral portion and the camera.

13. The electronic device of claim 11, further comprising a sealing member sealing between an outer side surface of the case and an inner side surface of the housing, and blocking introduction of a foreign material into the housing through the plurality of openings.

14. The electronic device of claim 11, wherein a shielding member is provided in the case between the acoustic component and the camera, and shields a magnetic force between the acoustic component and the camera.

15. The electronic device of claim 11, further comprising a display exposed through the first surface.

* * * * *